(12) United States Patent
Kosugi

(10) Patent No.: US 6,798,756 B1
(45) Date of Patent: Sep. 28, 2004

(54) DATA TRANSMISSION SYSTEM AND METHOD, AND DATA RECEIVING METHOD AND DEVICE

(75) Inventor: Hiroshi Kosugi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/230,648

(22) PCT Filed: Jun. 1, 1998

(86) PCT No.: PCT/JP98/02414

§ 371 (c)(1),
(2), (4) Date: May 3, 1999

(87) PCT Pub. No.: WO98/54899

PCT Pub. Date: Dec. 3, 1998

(30) Foreign Application Priority Data

May 30, 1997 (JP) .............................. 9-142663

(51) Int. Cl.[7] ................................. H04J 3/08
(52) U.S. Cl. ..................... 370/315; 370/475; 370/535
(58) Field of Search ............................... 370/277, 442, 370/475, 535, 537, 315; 725/64, 67, 68, 75, 87, 118, 136, 139, 98, 85, 48, 54, 63, 81

(56) References Cited

U.S. PATENT DOCUMENTS

| | | | | | |
|---|---|---|---|---|---|
| 4,922,536 | A | * | 5/1990 | Hoque ........................... 381/2 |
| 5,724,091 | A | * | 3/1998 | Freeman et al. ............ 725/138 |
| 5,903,569 | A | * | 5/1999 | Fujisaki ...................... 370/472 |
| 5,917,988 | A | * | 6/1999 | Eto .............................. 386/52 |
| 6,005,633 | A | * | 12/1999 | Kosugi ........................ 348/518 |
| 6,016,348 | A | * | 1/2000 | Blatter et al. .................. 380/5 |
| 6,055,270 | A | * | 4/2000 | Ozkan et al. .......... 375/240.03 |
| 6,133,910 | A | * | 10/2000 | Stinebruner ................... 725/49 |
| 6,157,674 | A | * | 12/2000 | Oda et al. .................... 375/240 |
| 6,163,644 | A | * | 12/2000 | Owashi et al. ................ 386/46 |
| 6,181,334 | B1 | * | 1/2001 | Freeman et al. ............ 725/138 |
| 6,188,438 | B1 | * | 2/2001 | Ueda .......................... 348/460 |
| 6,215,484 | B1 | * | 4/2001 | Freeman et al. ............ 725/126 |
| 6,219,359 | B1 | * | 4/2001 | Budge et al. ............... 370/538 |
| 6,226,443 | B1 | * | 5/2001 | Morioka et al. .............. 386/82 |
| 6,249,324 | B1 | * | 6/2001 | Sato et al. ................... 348/705 |
| 6,252,586 | B1 | * | 6/2001 | Freeman et al. ............ 725/136 |
| 6,275,529 | B1 | * | 8/2001 | Sato ...................... 375/240.01 |
| 6,278,717 | B1 | * | 8/2001 | Arsenault et al. ........... 370/477 |
| 6,278,739 | B2 | * | 8/2001 | Enomoto et al. ...... 375/240.26 |
| 6,285,824 | B1 | * | 9/2001 | Yanagihara et al. .......... 386/98 |
| 6,321,025 | B1 | * | 11/2001 | Owashi et al. ................ 386/83 |
| 6,357,045 | B1 | * | 3/2002 | Devaney ..................... 725/138 |
| 6,501,770 | B2 | * | 12/2002 | Arsenault et al. ........... 370/477 |

FOREIGN PATENT DOCUMENTS

| | | |
|---|---|---|
| JP | 7-226023 | 8/1995 |
| JP | 7-307059 | 11/1995 |
| JP | 7-327051 | 12/1995 |
| JP | 8-149428 | 6/1996 |
| JP | 8-279805 | 10/1996 |

OTHER PUBLICATIONS

Rogers, J. D. "SNG moves digital". Digital Satellite Technology and Electronic Newsgathering Colloquium. pp. 7/1–7/3. London, UK 1993.*

(List continued on next page.)

Primary Examiner—Chi Pham
Assistant Examiner—Anh Vu H Ly
(74) Attorney, Agent, or Firm—Frommer Lawrence Haug LLP; William S. Frommer; Dennis M. Smid

(57) ABSTRACT

A central broadcast station implements processing at a SDTI decoder unit 385, a MPEG decoder unit 387, a first editing system 389, and a MPEG encoder unit 373, etc. under control of a network computer 371 to SDTI bit stream obtained through a satellite $381_1$ from field site (not shown) to convert it into SDTI bit streams at a SDTI encoder unit 374 thereafter to multiplex them at a multiplexing unit 375 to send out it to a regional broadcast station through a satellite $381_2$.

33 Claims, 23 Drawing Sheets

OTHER PUBLICATIONS

Inoue, T. "An international digital SNG transmission system with variable information/FEC coding rate control" Global Telecommunications Conference, 1994. pp. 93–99 vol. 1.*

Kitazato, N. "A digital satellite news gathering system." Broadcasting Convention, 1990. pp. 346–350. Brighton, UK 1990.*

H. Hoffman, "Studio–Interfaces fur die paketierte Ubertragung von bitratenreduzierten Videosignalen" Fernseh–Und Kino–Technik, vol. 50, No. 6, (German) 1996, pp. 302, 304–308.

J.H. Wilkinson, "The Serial Digital Data Interface" IEE Conference, Publication No. 428 (England) 1996, pp. 425–430.

J.H. Wilkinson, H. Sakamoto, P. Horne, "SDDI as a Video Data Network Solution", IEE Conference Publication, No. 447, (England) 1997, pp. 380–385.

Yoshio Kamiura, "Packet Transmission SDTI (Serial Data Transport Interface) (in Japanese)", The Journal of the Institute f Image Information and Television Engineers, vol. 51, No. 11, pp. 1826–1834, (Tokyo) 1997.

* cited by examiner

|   | 1 | 2 |
|---|---|---|
| B9 | $\overline{EP1}$ | $\overline{EP2}$ |
| B8 | EP1 | EP2 |
| B7 | L7 | R5 |
| B6 | L6 | R4 |
| B5 | L5 | R3 |
| B4 | L4 | R2 |
| B3 | L3 | R1 |
| B2 | L2 | R0 |
| B1 | L1 | L9 |
| B0 | L0 | L8 |

FIG.5

|     | 1   | 2   |
| --- | --- | --- |
| B9  | $\overline{C8}$ | $\overline{C17}$ |
| B8  | C8  | C17 |
| B7  | C7  | C16 |
| B6  | C6  | C15 |
| B5  | C5  | C14 |
| B4  | C4  | C13 |
| B3  | C3  | C12 |
| B2  | C2  | C11 |
| B1  | C1  | C10 |
| B0  | C0  | C9  |

FIG.6

| $\overline{B8}$ | $\overline{B8}$ | $\overline{B8}$ | | | | | $\overline{B8}$ | $\overline{B8}$ | $\overline{B8}$ |
|---|---|---|---|---|---|---|---|---|---|
| B8 | B8 | B8 | | | | | B8 | B8 | B8 |
| | | | | | | | | | |
| | | | | | | | | | |
| | | | | | | | | | |
| | | | | | | | | | |
| | | | | | | | | | |
| | | | | | | | | | |
| B1 | B1 | B1 | | | | | B1 | B1 | B1 |
| B0 | B0 | B0 | | | | | B0 | B0 | B0 |

FIG.9

|    | 1 | 2 | 3 | 4 |
|----|---|---|---|---|
| B9 | $\overline{EP1}$ | $\overline{EP2}$ | $\overline{EP3}$ | $\overline{EP4}$ |
| B8 | EP1 | EP2 | EP3 | EP4 |
| B7 | C7 | C15 | C23 | C31 |
| B6 | C6 | C14 | C22 | C30 |
| B5 | C5 | C13 | C21 | C29 |
| B4 | C4 | C12 | C20 | C28 |
| B3 | C3 | C11 | C19 | C27 |
| B2 | C2 | C10 | C18 | C26 |
| B1 | C1 | C9 | C17 | C25 |
| B0 | C0 | C8 | C16 | C24 |

FIG.12

| SYNC WORD | TIMING REFERENCE SIGNAL | | | | (MEANING OF CHARACTER OF XYZ) |
|---|---|---|---|---|---|
| | 3FF | 000 | 000 | XYZ | |
| WORD ADDRESS EAV | 1440 | 1441 | 1442 | 1443 | |
| WORD ADDRESS SAV | 1712 | 1713 | 1714 | 1715 | |
| $B_9$ (MSB) | 1 | 0 | 0 | 1 | FIXED AND HELD AT 1 AT ALL TIMES |
| $B_8$ | 1 | 0 | 0 | F | 0 : 1-ST FIELD<br>1 : 2-ND FIELD |
| $B_7$ | 1 | 0 | 0 | V | 0 : EFFECTIVE PICTURE PERIOD<br>1 : VERTICAL BLANKING PERIOD |
| $B_6$ | 1 | 0 | 0 | H | 0 : AT TIME OF SAV<br>1 : AT TIME OF EAV |
| $B_5$ | 1 | 0 | 0 | P3 | ADDITION BIT FOR ERROR CORRECTION WITH RESPECT TO F. V. H. |
| $B_4$ | 1 | 0 | 0 | P2 | |
| $B_3$ | 1 | 0 | 0 | P1 | |
| $B_2$ | 1 | 0 | 0 | P0 | |
| $B_1$ | 1 | 0 | 0 | 0 | FIXED AND HELD AT 0 AT ALL TIMES |
| $B_0$ (LSB) | 1 | 0 | 0 | 0 | |

FIG.13

DATA TRANSMISSION SYSTEM AND METHOD, AND DATA RECEIVING METHOD AND DEVICE

TECHNICAL FIELD

This invention relates to a data transmission system and a data transmission method for carrying out transmission of data and a data receiving apparatus and a data receiving method for receiving data, and more particularly to a data transmission system and a data transmission method for carrying out transmission of data by relaying, etc. and a data receiving apparatus and a data receiving method for receiving data by relaying, etc.

BACKGROUND ART

In recent years, in the broadcasting station, as a method of quickly carrying out transmission of editing material or news gathering material, satellite news gathering (SNG) system has been offered. In general, as this SNG system, there is provided the system of initially carrying out digital modulation of material to be transmitted at the sending-out side of material to carry out transmission thereof to the broadcast station by using the satellite channel, and to further carry out, at the receiving side of material, digital demodulation of material which has been transmitted to edit the demodulated material to thereby generate video program.

This SNG system is used for sending material such as gathered image gathered at the field to the central broadcast station, or is used for carrying out transmission of program material edited at the central broadcast station from the central broadcast station to the regional or local broadcast station.

The broadcast station must pay utilization charge of this satellite channel by the satellite channel used for carrying out transmission of material by using this SNG and the time at which its satellite channel is used.

Since the transmission unit using the conventional SNG system required one transponder, i.e. one satellite channel for the purpose of carrying out transmission of one material, it has the problem that cost for lending transponders of plural channels becomes high in order to simultaneously carry out, e.g., on the real time basis, transmission of plural live images prepared at the field to the central broadcast station.

Moreover, in order to carry out transmission of field of, e.g., two hours from the field to the central broadcast station, it is necessary to occupy the satellite channel over two hours and the cost required for lending transponder becomes burden according as the time of material becomes longer.

Meanwhile, in the data communication, etc., the data receiving unit is used as the relaying transmitting unit to have ability to transmit data to the remote place. However, there are instances where, as data inputted to such data receiving unit, plural kinds of data are multiplexed. Further, data inputted in the multiplexed state are selectively read by respective receiving sections of the data receiving unit. Data are read in the state selected every data of the same kind, e.g., transmission destination by the respective receiving sections. Data which have been read into respective receiving sections in this way are transmitted toward equipments of respective destinations through the relaying receiving unit.

Reading operations every various kinds of data by respective receiving sections of the data receiving unit were carried out by setting in advance the receiving section in a manner to be in correspondence with destinations to be transmitted of respective data transmitted to the data receiving unit. For example, user carried out in advance setting operations of respective receiving sections caused to be in correspondence with destinations of respective data in a manner caused to be in correspondence with respective data inputted to the data receiving unit.

In this case, there are many instances where data inputted to the data receiving unit are changed, e.g., destinations of data are changed. User is required to set, for a second time, respective receiving sections in a manner caused to be in correspondence with that change. However, in the case of a method of setting respective receiving sections every time in a manner caused to be in correspondence with change of inputted data, convenience of use becomes poor.

DISCLOSURE OF THE INVENTION

This invention has been made in view of the above-described actual circumstances, and its object is to provide a transmission system and a transmission method in which one satellite channel is used to carry out transmission of video data of plural channels to carry out transmission of material at a high speed, and a data receiving apparatus and a data receiving method in which there is no necessity of setting the receiving unit in advance in a manner caused to be in correspondence with inputted data.

In order to solve the above-described problems, a data transmission method according to this invention includes, in a transmission system for carrying out transmission of video data of plural channels, encoding means for respectively encoding the video data of the plural channels, format converting means for inserting video data of plural channels encoded by the encoding means into payload portion of a predetermined serial transmission format to thereby convert format of the video data of the plural channels, multiplexing means for multiplexing video data of plural channels which have been caused to undergo format conversion by the format converting means, and transmission means for carrying out transmission of data multiplexed by the multiplexing means.

Moreover, a transmission system according to this invention is directed to a transmission system caused to be of configuration including a transmitting unit for transmitting video data and a receiving unit for receiving video data which has been transmitted from the transmitting unit, the transmitting unit including encoding means for encoding the video data, high speed reproducing means for reproducing, at speed of N times, video data encoded by the encoding means, format converting means for converting video data of N times speed reproduced by the high speed reproducing means into data of format for a predetermined serial transmission in order to carry out transmission thereof at rate corresponding to the N times speed, and transmission means for carrying out transmission of data which has been caused to undergo format conversion by the format converting means at rate corresponding to the N times speed; and the receiving unit including receiving means for receiving video data of N times speed which has been caused to undergo transmission at rate corresponding to the N times speed from the transmission means and high speed recording means for recording, at N times speed, the received video data of N times speed.

A transmission method according to this invention includes, in a transmission method for carrying out transmission of video data of plural channels, a step of respectively encoding the video data of plural channels to thereby generate encoded video data of plural channels, a step of inserting the encoded video data of plural channels into payload portion of a predetermined serial transmission format to thereby generate video data converted into the predetermined serial transmission format, a step of multiplexing the video data of plural channels converted into the predetermined serial transmission format to thereby generate the multiplexed video data of the predetermined serial transmission format, and a step of carrying out transmission of the multiplexed data of the predetermined serial transmission format.

A transmission method according to this invention is directed to a transmission method for carrying out transmission of video data of a transmitting unit for transmitting video data to a receiving unit, the method being adapted to reproduce, at the transmitting unit side, encoded video data at N times speed to convert video data reproduced at N times speed into data of format for a predetermined serial transmission for the purpose of carrying out transmission thereof at rate corresponding to the N times speed to carry out transmission of video data of N times speed which has been caused to undergo format conversion at rate corresponding to the N times speed from the transmitting unit to the receiving unit, and to receive, at the receiving unit side, video data of N times speed which has been caused to undergo transmission at rate corresponding to the N times speed from the transmission means to record the received video data of N times speed at N times speed.

A data receiving apparatus according to this invention comprises destination information reading means for reading out all destination address information of input data, receiving means adapted so that predetermined receiving addresses are set to receive data of corresponding set one of the receiving addresses within the input data, and address setting means for setting receiving address at the receiving means on the basis of destination address information that the destination information reading means has read out.

The data receiving apparatus constituted in this way receives data every destination by the receiving means in which receiving addresses are set by address setting means on the basis of destination address information that the destination information reading means has read out.

A data receiving method according to this invention includes a destination information reading step of reading out all destination address information of input data, an address setting step of setting receiving address of receiving means on the basis of the destination address information which has been read out at the destination information reading step, and receiving step of receiving data of corresponding set one of the receiving addresses of the input data by the receiving means set to a predetermined receiving address at the address setting step.

The data receiving method featured above is adapted to receive data every destination at the receiving step by the receiving unit in which receiving addresses are set at address setting step on the basis of destination address information which has been read out at the destination information reading step.

BRIEF DESCRIPTION OF THE DRAWINGS

FIG. 5 is a view showing SDTI header packet of an embodiment of a communication unit of this invention.

FIG. 6 is a view showing line number CRC of SDTI of an embodiment of a transmitting unit of this invention.

FIG. 9 is a view showing user data of SDTI of the embodiment of the transmitting unit of this invention.

FIG. 12 is a view showing word count of SDTI of the embodiment of the transmitting unit of this invention.

FIG. 13 is a view showing reference frame signal of SDTI of the embodiment of the transmitting unit of this invention.

BEST MODE FOR CARRYING OUT THE INVENTION

Preferred embodiments of this invention will now be described with reference to the attached drawings.

Figure 1:
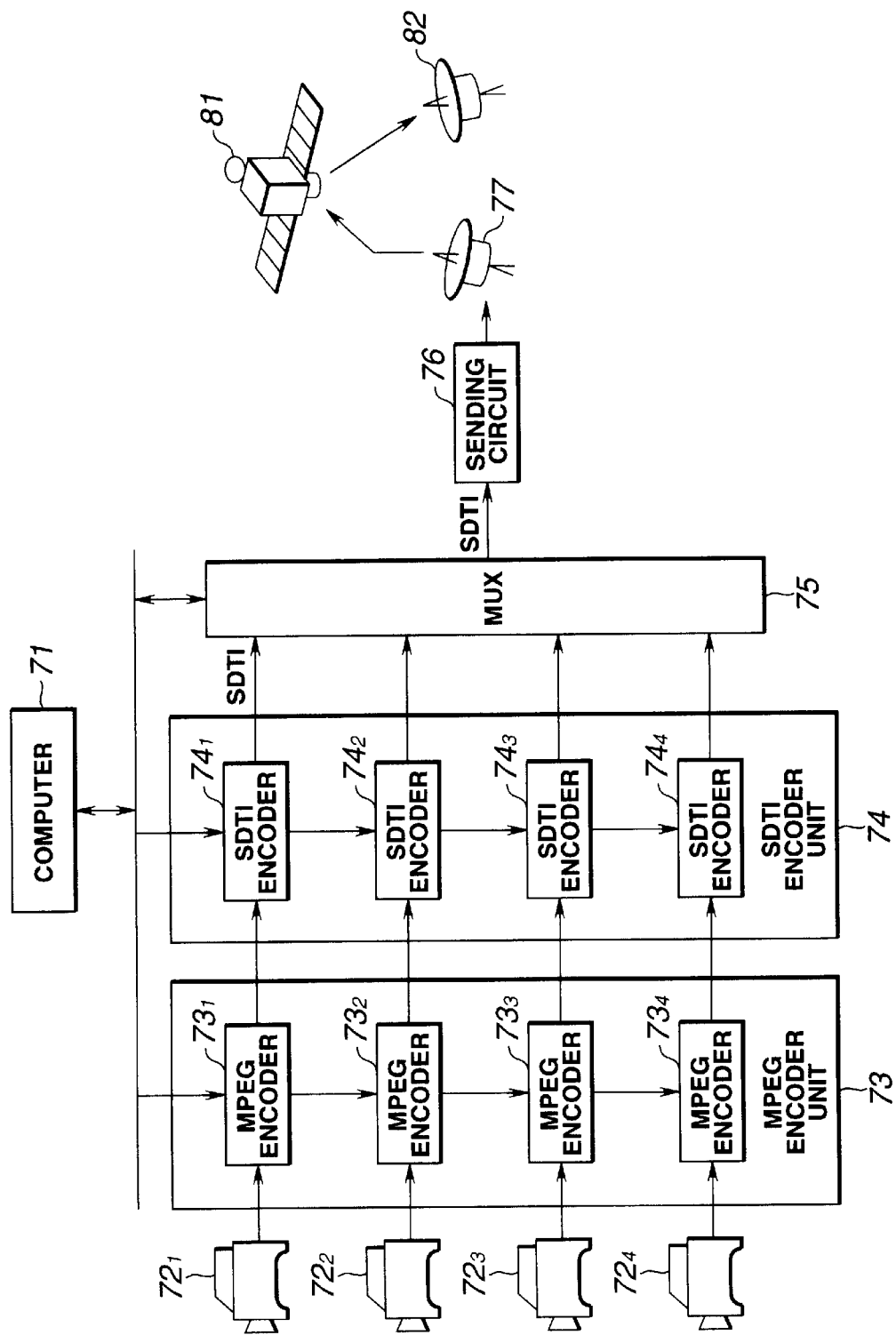
FIG. 1 is a block diagram showing the configuration of field site of the transmitting side.
Figure 2:
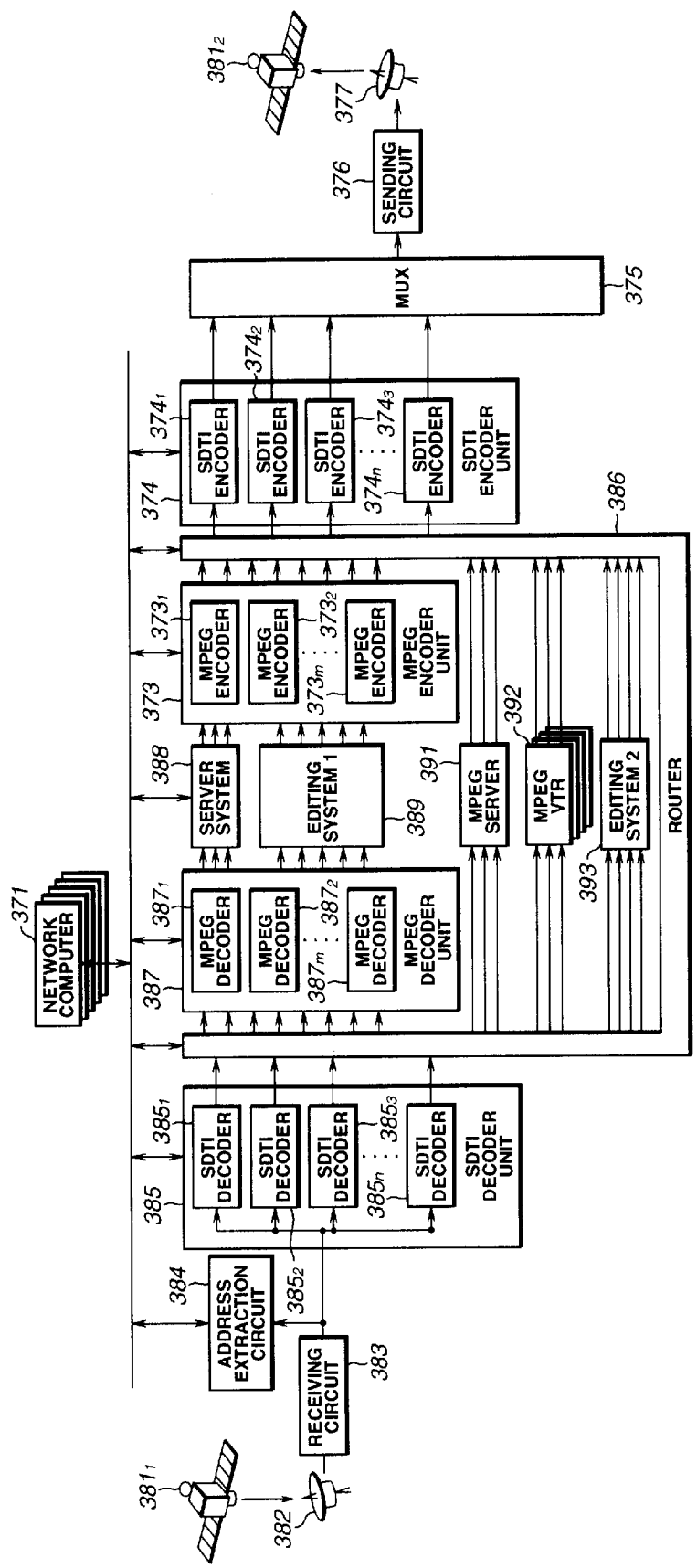
FIG. 2 is a block diagram showing the configuration of central broadcast station.
Figure 3:
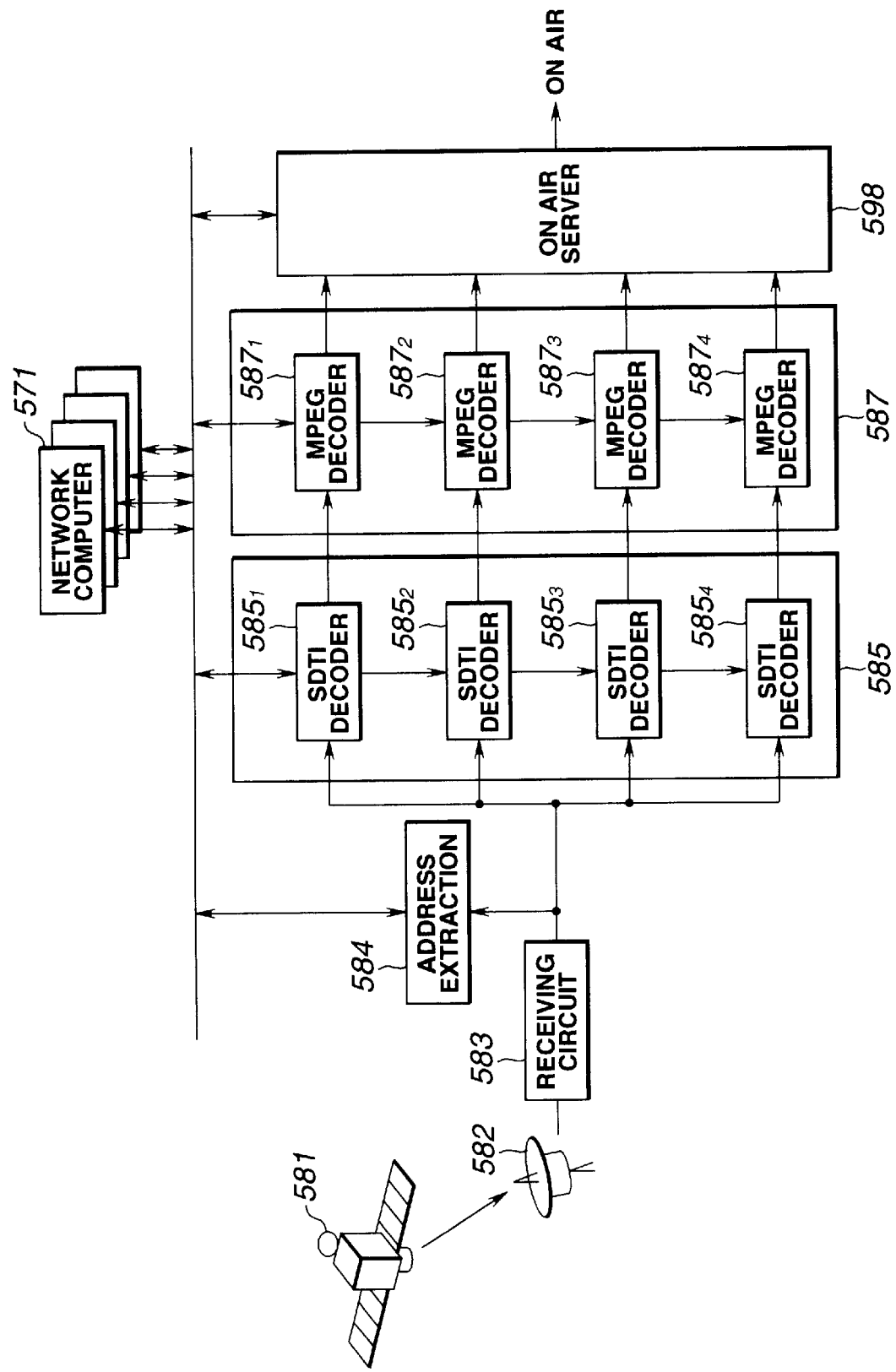
FIG. 3 is a block diagram showing the configuration of regional broadcast station of the receiving side.

The first embodiment of this invention is directed to a transmission system caused to be of configuration composed of transmitting side such as field site shown in FIG. 1, a central broadcast station for implementing processing to data from the transmitting side as shown in FIG. 2, and receiving side such as regional (local) broadcast station for receiving data from the central broadcast station as shown in FIG. 3.

In this transmission system, data from the transmitting side to the central broadcast station and data from the central broadcast station to the receiving side are caused to undergo transmission from the transmitting antenna to the receiving antenna through satellite.

While video signal is taken as example as signal serving as material in the following explanation, it is a matter of course that not only video signal but also various data such as speech signal or ancillary data, etc. are included.

Initially, explanation will be given with reference to FIG. 1 in connection with the field site of out-side broadcast van, etc. constituting the transmitting side of the transmission system.

The field site includes a video input unit such as video camera 72, etc., a MPEG encoder unit 73 for encoding video signal by MPEG (Moving Picture Experts Group) standard, a SDTI encoder unit 74 for converting MPEG-encoded video signal into data of a predetermined serial transmission format, e.g., format of the so-called SDTI (Serial Digital Transport Interface) standard which will be described later, a multiplexer (MUX) 75 for multiplexing inputted SDTI bit streams of plural channels, and a computer 71 for controlling the video camera 73, the MPEG encoder unit 73, the SDTI encoder unit 74 and the multiplexer 75.

At the field site, video signals by a predetermined serial transmission format inputted from plural video cameras $72_1$ to $72_4$, e.g., the so-called SDI (Serial Digital Interface) standard are respectively encoded into MPEG bit streams at MPEG encoders $73_1$ to $73_4$ provided at the MPEG encoder unit 73.

MPEG bit streams from the MPEG encoders 73, to $73_4$ provided at the MPEG encoder unit 73 are respectively converted into SDTI bit streams at SDTI encoders $74_1$ to $74_4$ provided at the SDTI encoder unit 74.

At this SDTI encoder unit 74, encoded video data of plural channels are inserted into the payload portion of a predetermined serial transmission format to thereby convert it into data of SDTI standard of format of the video data of plural channels.

SDTI bit streams from the SDTI encoders $74_1$ to $74_4$ provided at the SDTI encoder unit 74 are multiplexed at the multiplexer (multiplexing unit) 75 so that there result the multiplexed SDTI bit stream.

Flow of signal from these video cameras 72 to the multiplexing unit 75 via the MPEG encoder unit 73 and the SDTI encoder unit 74 is controlled by the computer 71.

The field site includes a sending circuit 76 for implementing processing for sending out it to the external with respect to the SDTI bit stream.

SDTI bit stream from the multiplexing unit 75 is caused to undergo processing at the sending circuit 76, and is then transmitted to a satellite 81 by way of a transmitting antenna 77. The satellite 81 repeats (relays) signal from the transmitting antenna 77 to send it to the receiving antenna 82.

In this case, the SDTI standard is prescribed by the SMPTE (Society of Motion Picture and Television Engineers) 305M. The detail of this SDTI standard will be described in detail.

As described above, the transmitting side includes a MPEG encoder unit for respectively encoding video data of plural channels, a SDTI encoder unit for converting bit stream obtained by encoding of the MPEG encoder unit into SDTI, a multiplexing unit for multiplexing video data of plural channels from the SDTI encoder unit, and a transmitting circuit and a transmitting antenna for sending data from the multiplexing unit through the satellite.

Explanation will be subsequently given with reference to FIG. 2 in connection with the configuration of the central broadcast station of the data transmission system.

The central broadcast station includes a receiving antenna 382 for receiving signal, a receiving circuit 383 for implementing processing to the signal received at the receiving antenna to allow it to be SDTI bit stream, an address extracting circuit 384 for extracting address from SDTI bit stream from the receiving circuit 383, and a SDTI decode unit 385 for decoding the SDTI bit stream from the receiving circuit 383 to allow it to be MPEG bit stream.

Signal transmitted from a satellite 3811 is received at the receiving antenna 382, and is caused to be SDTI bit stream at the receiving circuit 383.

SDTI bit stream from the receiving circuit is caused to undergo processing such that address is extracted at an address extracting circuit 384. The address thus extracted is separated at the SDTI decoder unit 385, and addresses thus separated are respectively decoded into MPEG bit streams at SDTI decoders $385_1$ to $385_n$ provided at the SDTI decoder unit 385.

Moreover, the central broadcast station includes a router 386 serving as connecting means for carrying out switching of path of signal, a MPEG decoder unit 387 for decoding MPEG bit stream obtained through the router 386, a server system 388 supplied with video signal decoded at the MPEG decoder unit 387, a first editing system 389 for sending video signal from the MPEG decoder unit 387, and a MPEG encoder unit 373 for encoding video signals from the server system 388 and the first editing system 389 into MPEG bit stream.

The router 386 is connecting means connected to plural equipments and adapted for carrying out switching of path of signal between these equipments. The router 386 is connected to the SDTI decoder unit 385, a MPEG decoder unit 387, a MPEG server 391, a MPEG VTR 392, a second editing system 393, a MPEG encoder unit 373 and a SDTI encoder unit 374 to carry out switching of path between these equipments.

MPEG bit streams of plural channels obtained through the router 386 are decoded into video signals at plural MPEG decoders $387_1$ to $387_m$ provided at the MPEG decoder unit 387.

Video signals of plural channels from the MPEG decoder unit 387 are caused to undergo processing at the server system 388, and are edited at the first editing system 389.

Video signals of plural channels from the server system 388 and the first editing system 389 are respectively encoded into MPEG bit streams at plural MPEG encoders $373_1$ to $373_m$ provided at the MPEG encoder unit 373.

Further, the central broadcast station includes the MPEG server 391 for implementing processing with respect to MPEG bit stream obtained through the router 386, the MPEG VTR (Video Tape Recorder) 392 for recording/reproducing MPEG bit stream from the router 386 with respect to the video tape, and a second editing system 393 for editing MPEG bit stream from the router 386.

The MPEG server 391 implements processing with respect to MPEG bit stream obtained through the router 386. The MPEG VTR 392 records MPEG bit stream given through the router 386 onto the video tape, and reproduces MPEG bit stream recorded on the video tape.

As this MPEG VTR 392, there may be also used a VTR for recording/reproducing video data at normal (ordinary) speed and recording/reproducing video data at speed N times larger than normal (ordinary) speed.

The second editing system 393 edits MPEG bit stream given through the router 386.

Further, the central broadcast station includes the SDTI encoder unit 374 for converting MPEG bit stream into SDTI bit stream, a multiplexer (MUX) 375 for multiplexing SDTI bit streams of plural channels, and a network computer 371 for controlling respective portions of this central broadcast station through the network.

MPEG bit streams of plural channels given through the router 386 are respectively encoded into SDTI bit streams at SDTI encoders $374_1$ to $374_n$ provided at the SDTI encoder unit 374.

Plural SDTI bit streams from the SDTI encoder unit 374 are multiplexed at the multiplexing unit (MUX) 375.

The network computer 371 is a control unit for controlling respective portions of the central broadcast station. Flow of signal from the receiving circuit 383 at this central broadcast station to the multiplexer (multiplexing unit) 375 is controlled at this network computer 371. In this example, the network computer 371 is constituted with one or two plural computers or more.

Moreover, the central broadcast station includes a sending circuit 376 for implementing, to signal, processing for sending, and a transmitting antenna 377 for transmitting signal.

SDTI bit stream multiplexed at the MUX 375 is caused to undergo processing for sending at the sending circuit 376, and the bit stream thus processed is sent from the transmitting antenna 377 to a satellite $381_2$.

As described above, the central broadcast station includes the receiving antenna and the receiving circuit for receiving data given through the satellite, the SDTI decoders for respectively decoding data of SDTI of plural channels to allow them to be MPEG bit streams, the MPEG decoders for decoding MPEG bit stream to allow them to be video signals, the MPEG encoders for encoding video signals into MPEG bit streams, the SDTI encoders for converting the MPEG bit streams into SDTIs, and the sending circuit and the transmitting antenna for sending data through the satellite.

Further, at the central station, as the MPEG VTR 392, there may be also used VTR for recording video data given at N times speed from the SDTI decoder unit, and for reproducing video data at N times speed. In this case, the SDTI decoder unit allows inputted data to be bit stream of N times speed. Moreover, the SDTI encoder unit sends bit stream inputted at N times speed as data of normal (ordinary) speed.

Subsequently, explanation will be given with reference to FIG. 3 in connection with the regional broadcast station constituting the receiving side of the data transmission system.

The regional broadcast station includes a receiving antenna 582 for receiving signal, and a receiving circuit 583 for implementing processing to signal from the receiving antenna to allow it to be SDTI bit stream.

Signal transmitted from a satellite 581 is received at the receiving antenna 582. Signal from the receiving antenna 582 is caused to undergo processing at the receiving circuit 583 so that there results SDTI bit stream.

Moreover, the regional broadcast station includes an address extraction circuit 584 for extracting address from SDTI bit stream from the receiving circuit 583, a SDTI decoder unit 585 for decoding SDTI bit stream, a MPEG decoder unit 587 for decoding MPEG bit stream into video signal, and an on air server 598 for allowing video signal from the MPEG decoder unit 587 to undergo processing for on air.

SDTI bit stream from the receiving circuit 583 is caused to undergo processing such that address is extracted at the address extracting circuit 584, and is decoded every channel at SDTI decoders $585_1$ to $585_4$ provided at the SDTI decoder unit 585 so that there result MPEG bit streams.

MPEG bit streams from the SDTI decoder unit 585 are respectively decoded at MPEG decoders $387_1$ to $387_4$ provided at the MPEG decoder unit so that there result video signals.

The video signal from the MPEG decoder unit 587 is caused to undergo processing for on air at the on air server 598 so that it is subjected to on air.

Further, the regional broadcast station includes a network computer 571 for controlling respective portions of this regional broadcast station.

The network computer 571 controls, through the network, the address extraction circuit 584, the SDTI decoder unit 585, the MPEG decoder unit 587, and the on air server 598.

This network computer 571 is composed of one or two plural computers or more.

As described above, the receiving side includes the receiving antenna and the receiving circuit for receiving data given through the satellite, the SDTI decoder unit for decoding data of SDTI into MPEG bit streams every plural channels, and the MPEG decoder unit for decoding MPEG bit streams from the SDTI decoder unit into video signals every plural channels.

As explained above, in the transmission system for carrying out transmission of video data of plural channels, this embodiment includes the MPEG encoder unit for respectively MPEG-encoding the video data of plural channels, the SDTI encoder unit, the multiplexing unit for multiplexing video data of plural channels which have been subjected to format conversion, the transmitting antenna for carrying out transmission of multiplexed data, and the transmission path including satellite and receiving antenna.

Moreover, the MPEG encoder unit, the SDTI encoder, the multiplexing unit (multiplexer), and the transmitting antenna for carrying out transmission of data are provided at the transmitting side, and the receiving side for receiving multiplexed video data which has been transmitted from the transmitting side includes the receiving antenna for receiving multiplexed video data of the SDTI standard which has been transmitted through the satellite from the transmitting side, the SDTI decoder for converting multiplexed data of the SDTI standard into MPEG bit stream, and the MPEG decoder for decoding bit stream from the SDTI decoder into video data.

Explanation will now be given in connection with the SDTI standard used in this embodiment.

The standard of this SDTI format prescribes a method of carrying out transmission of data caused to be of packet structure within, e.g., the broadcast station or the production house, and data packet and synchronizing signal are compatible with SMPTE 259 M (4:2:2 Component SDI). Namely, this SDTI format is caused to be of configuration in which data of the SDTI format can be converted into data of the SDI format and data of the SDI format can be converted into data of the SDTI format in a reversible manner. In addition, parameter of the signal format is compatible with SMPTE 259M (4:2:2 Component SDI).

Figures 4A, 4B:
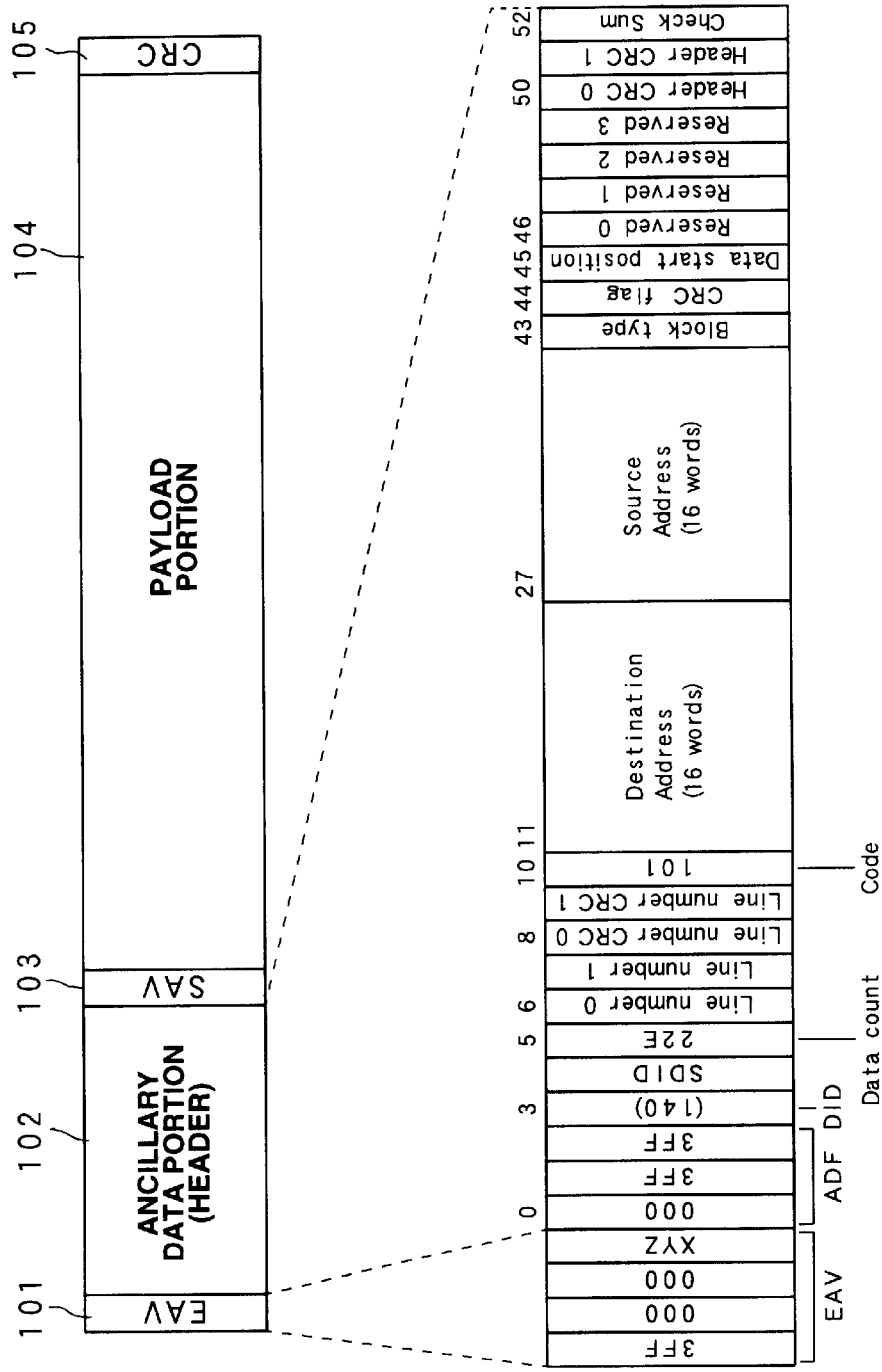
FIG. 4A is a data structural view showing SDTI format for adding destination address information to inputted data.
FIG. 4B is a data structural view showing EAV of SDTI format and ancillary data portion.

As shown in FIG. 4A, substantially similarly to the signal format of the SDI format, the signal format of the SDTI format includes EAV (End of Active Video) 101, Ancillary data 102, SAV (Start of Active Video) storage portion 103, Payload portion 104 including user data, and CRC (Cyclic Redundancy Check) 105. In this case, the payload portion 104 corresponds to active videos ACV1, ACV2 of the signal format of the SDI format. In the signal format of the SDTI format, ancillarly data does not include audio data unlike the signal format of the SDI format, and the payload includes video data, audio data and control data. Further, EAV and SAV are separation codes of signal. The ancillary data portion 102 includes header including synchronizing signal. The CRC 105 is CRC code used for error detection and error correction of a portion of the ancillary data 41 and the payload portion.

In addition, as data stream, even any packet data or signal in which the maximum data rate is 234 M bit/s or less may be caused to undergo transmission.

Next, the standards quoted by this standard are shown. In the case where these standards are quoted, they are considered as a portion of this standard. At the time point when this standard is established, the following standard is the latest standard. However, since this standard may be altered, it is assumed to consider whether or not the latest version can be applied in handling this standard.

SMPTE 125M, for Television-Component Signal 4:2:2 Bit-Parallel Digital Interface SMPTE 259M, for Television-10-bit 4:2:2 Component and 4 fsc NTSC Composite Digital Signals-Serial Digital Interface SMPTE 291M, for Television-Ancillary Data Packet and Space Formatting The general specification will now be described. The clock signal is caused to be similar to that prescribed by the SMPTE 125M. The level and the specification of signal are the same as those prescribed at the SMPTE 259M. The data rate of the serial data stream is 270M bit/s at the maximum. It is desirable that the same type as that prescribed at the SMPTE 259M is employed as the connector used. The characteristic of the interface requires that it can be guaranteed that signal loss at 135 MHz produced by the characteristic of the coaxial cable is not above about 30 dB.

The SDTI header will now be described. SDTI header data packet is shown in FIG. 4B. The SDTI header data packet is constituted by 53 words. SDTI header is disposed (assigned) immediately after the EAV storage portion 101. This is in conformity with Ancillary Data Packet (Type 2) of SMPTE 291M.

Ancillary Data Flag (ADF) is equivalent to that prescribed at SMPTE 125M, and is constituted by three words of 000h, 3FFh and 3FFh. SDTI header is disposed (assigned) succeedingly (subsequently) thereto.

As data ID (Data ID (DID), 140h is set as value in the example for discriminating Ancillary Data of SDTI header. The data ID (Data ID (DID)) consists of B7 to B0: data portion of lower order 8 bits, and parity portion of upper order 2 bits consisting of B8: even parity with respect to B7 to B0 and B9: complement of B8.

Secondary Data ID (SDID) consists of B7 to B0: data portion of lower order 8 bits and parity portion of upper order 2 bits of B8: even parity with respect to B7 to B0 and B9: complement of B8.

Data Count (DC) consists of B7 to B0: data portion of lower order 8 bits and parity portion of upper order 2 bits consisting of B8: even parity with respect to B7 to B0 and B9: complement of B8.

The configuration of SDTI data will be subsequently described in detail in order.

As shown in FIG. 4A, the transmission packet by the SDTI format is caused to be of configuration including EAV (End of Active Video) storage portion 101 for storing end code of the active video portion, ancillary data portion 102 for storing header, etc., SAV (Start of Active Video) storage portion 103 for storing start code (SAV) of active video portion, payload portion 104 in which data to be transmitted, e.g., video signal in this case is stored, and CRC 105 in which CRC code is stored.

The EAV storage portion 101 is adapted so that there is stored end code EAV of active video portion indicating end of the payload portion 104 and for separating from the ancillary data portion 102 with respect to each other.

The ancillary data portion 102 is adapted to store header and/or ancillary data, etc.

The SAV storage portion 103 is adapted to store start code SAV of active video portion indicating start of payload portion 104 and for separating from ancillary data.

The payload portion 104 is area for storing video signal caused to undergo transmission. In this example, any one of video signals of the VTR 14, the digital video camera 15 and the analog video camera 16 is stored.

In this example, as shown in FIG. 4B, for example, header of ancillary data portion 102 is caused to be of configuration including ancillary data flag (ADF) of three words in total, data ID (DID) of one word, secondary data ID (SDID) of one word, Data count of one word, line number of two words (Line number 0, Line number 1), line number CRC of two words (Line number CRC0, Line number CRC1), code of one word (CODE), Destination Address information of 16 words, Source Address information of 16 words, Block type of one word, CRC flag of one word, Data start position of one word, header expansion reserved data of four words (Reserved 0, Reserved 1, Reserved 2, Reserved 3), header CRC of two words (Header CRC0, Header CRC1), and Check Sum of one word.

In this case, data ID indicates that destination address information and source address information are stored in this ancillary data portion 102.

Data count indicates the number of data caused to undergo transmission which has been counted. Code indicates whether this transmission packet is SDTI format or other format.

Destination address information and source address information are data indicating address of transmission destination and address of transmission source, e.g., data for discrimination of equipment of destination to which transmission packet is caused to undergo transmission and equipment which has sent this transmission packet.

As the block type, there is included data indicating data configuration of payload portion 104. In more practical sense, in the case where, e.g., transmission of fixed length data is carried out, the payload portion 104 is used as 1440 words one block configuration, 719 word two block configuration, . . . , 5 word 278 block configuration, or it indicates that transmission of variable length data is carried out, etc. For example, in the case where variable length data is designated by block type and the payload portion 104 includes plural data, end code EAV indicating ends of respective data and start code SAV indicating that the next data is started, etc. are inserted between data. Further, only end code is added to ends of all data.

CRC flag indicates whether or not CRC code is added to the portion after the payload portion 104. Data start position indicates start position of the payload portion 104.

Check sum is used for the purpose of confirming effectiveness of data of frame within transmission packet, e.g., data from data ID to header CRC in this example.

By transmission packet of SDTI format constituted as described above, destination address information are added to respective video signals.

Explanation will be subsequently given in detail with reference to the attached drawings in connection with data constituting the SDTI format.

Line Number consists of 2 words of Line Number 0 and Line Number 1, and they are respectively, as shown in FIG. 5, L9 to L0: Line Number, R5 to R0: Reserved Bit, EP1: even parity with respect to L7 to L0 and EP2: even parity with respect to R5 to R0 and L9, L8.

Succeedingly (subsequently) to Line Number, Line Number CRC is disposed (assigned). Line number CRC is constituted by 2 words, and consists, as shown in FIG. 6, of B0 to B8:C8 to C0 check code and B9: its complement, and B0 to B8: C17 to C9 check code and B9: and its complement, and all of 10 bit width of 5 words from data ID up to Line Number 1 are applied. The generative polynomial with respect to Line Number CRC is $G(X)=X18+X5+X4+1$, and is the same as that prescribed at ITU-T X.25 which prescribes the International Electric Communication Standard.

Figure 7:
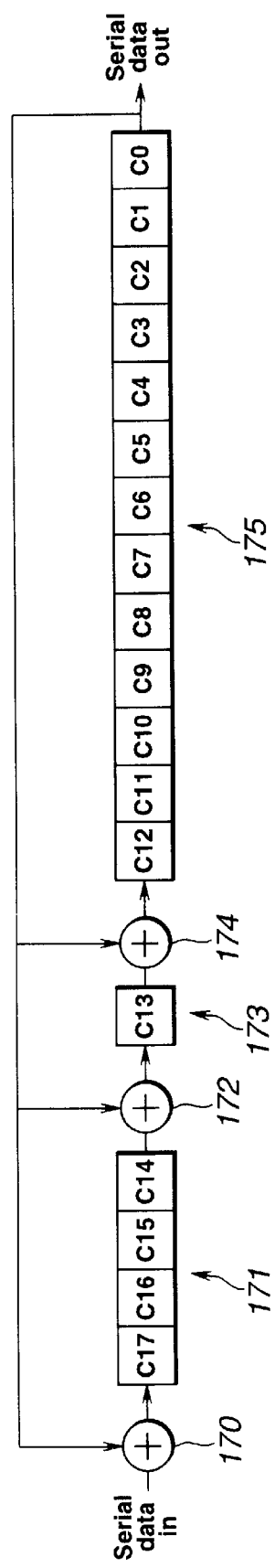
FIG. 7 is a view showing a generating circuit for line number CRC of SDTI of the embodiment of the transmitting unit of this invention.

A generation circuit for this Line Number CRC is shown in FIG. 7. In FIG. 7, this generation circuit includes an exclusive OR circuit 170 for inputting input serial data and output serial data of the eighteenth stage fed back to the initial stage, a four stages of D-type flip-flop 171 for inputting output of the exclusive OR circuit 170, an exclusive OR circuit 172 for inputting output of the D-type flip-flop 171 and output serial data fed back to the fourth stage, an one stage of D-type flip-flop 173 for inputting output of the exclusive OR circuit 172, an exclusive OR circuit 174 for inputting output of the D-type flip-flop 173 and output serial data fed back to the fifth stage, and a thirteen stages of D-type flip-flop 175 for inputting output of the exclusive OR circuit 174 to output serial data of the final eighteenth stage.

By a generation circuit in which feedback shift register of 18 bits is constituted by such eighteen stages of D-type flip-flops 171, 173, 175, outputs of the eighteenth stage, the fifth stage and the fourth stage are fed back to the initial stage to take exclusive OR. Thus, error detection code is generated by modulation system based on the above-described generative polynomial.

Initial values of Line Number CRC are respectively set to 1FFh and 1FFh by eighteen stages of D-type flip-flops 171, 173, 175 of the generative circuit.

Code represents kind of data in the payload. Code has the following value by one word. Namely, 101h: data in the payload represents SDTI, and 200h: data in the payload represents SDI.

Destination Address represents address of data transmission destination, and the Source Address represents address of data transmission source. These addresses are both constituted by 16 words.

Block type is type for discriminating payload segmentation, and consists of B7 to B0: data portion of lower order 8 bits and parity portion consisting of B8: even parity with respect to B7 to B0 and B9: complement of B8.

The Block type has value of 101h to 146h in correspondence with fixed block size, wherein segmentation is set in the state where words and blocks are caused to be different. The maximum value of user data word set at this segmentation is 1438 words per each line.

Block type with respect to adjustable block size has value of 1C1h. With respect to the adjustable block size, successive 1438 user data words or more are perceptible.

CRC flag is flag for discriminating existence of CRC in the payload. CRC flag is 1 word, and there are instances where 101h:CRC is placed (assigned) at the last portion of the payload (Active), or CRC flag is not placed (assigned) at the payload (Inactive) in dependency upon that value.

Figure 8:
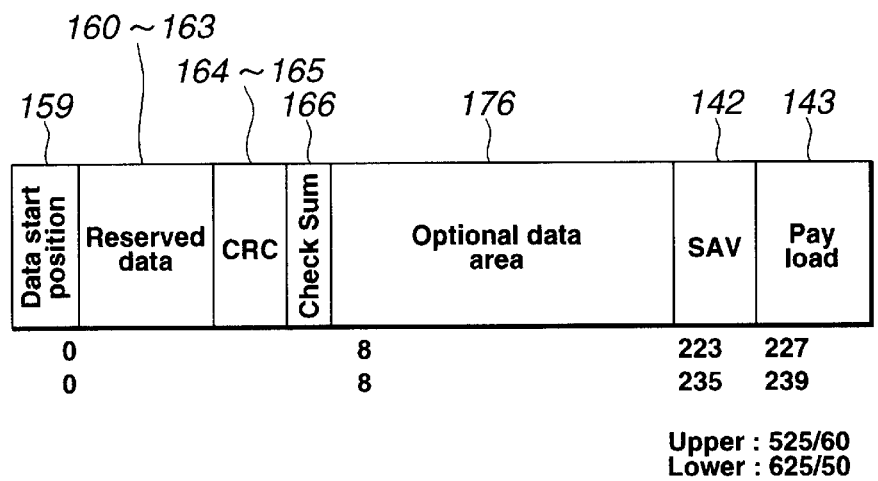
FIG. 8 is a view showing data start position of SDTI of the embodiment of the transmitting unit of this invention.

Data start position represents starting position of payload. As shown in FIG. 8, value of Data start position is 1EFh (227-th) in the case of the 525/60 system and is 1EFh (239-th) in the case of the 625/50 system. In this case, when payload is expanded until the maximum size by using remainder of ancillary data area, value of Data start position becomes 108h (eighth word). At this time, user data is inserted from the next portion of Check Sum address. Even in the case where payload is expanded, SAV must exist within the data stream. Data start position 159 consists of B7 to B0: data portion of lower order 8 bits and parity portion consisting of B8: even parity with respect to B7 to B0 and B9: complement of B8.

Header Expansion Reserved Data: Reserved 0 (160), Reserved 1 (161), Reserved 2 (162), Reserved 3 (163) are placed (assigned) at the portion after Data start position 159.

Header CRC0 (164) and header CRC1 (165) are inserted succeedingly (subsequently) to ancillary data. As Header CRC, 10 bit width from code 154 up to Reserved 3 (63) are applied. The generative polynomial with respect to Header CRC is the same as that of Line Number CRC (152).

Check Sum 166 words are words for confirming effectiveness of data from data ID (Data ID) 147 up to header CRC1 (165).

The user data signal format will now be described. User data is inserted into 12 line to 275 line in the case of the 525/60 system, and is inserted into 8 line to 321 line in the case of the 625/50 system.

9 bit to 10-bit mapping of user data will now be described. As shown in FIG. 9, user data consists of B7 to B0: data portion of lower order 8 bits and B8: even parity with respect to B7 to B0, or B8 to B0: data portion of lower order 9 bit and B9: parity portion consisting of complement of B8.

Figure 10:
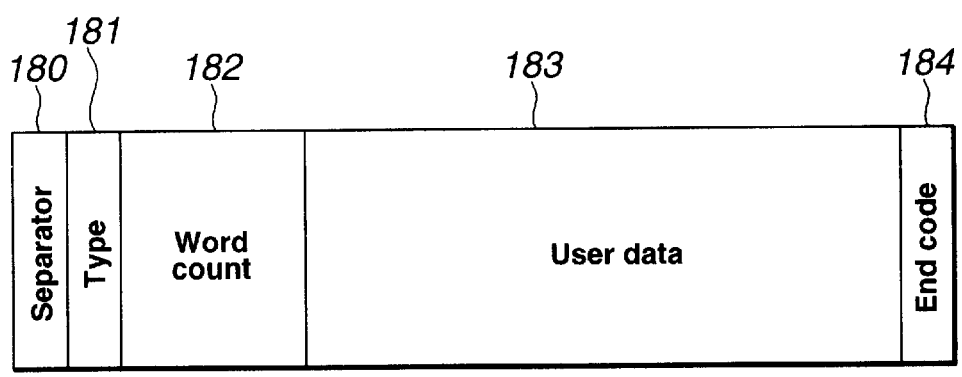
FIG. 10 is a view showing user data header of fixed block size of SDTI of the embodiment of the transmitting unit of this invention.
Figure 11:
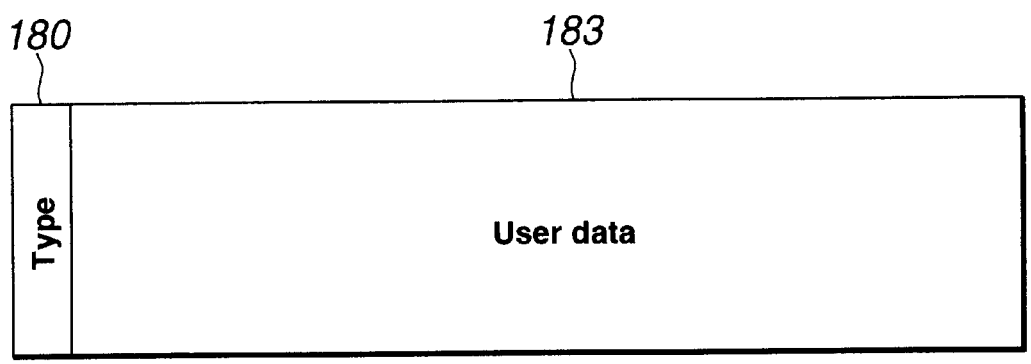
FIG. 11 is a view showing user data header of adjustable block size of SDTI of the embodiment of the transmitting unit of this invention.

The User Data Header will now be described. User data header is placed (assigned) at the portion before respective blocks of user data. The user data header is constituted as shown in FIG. 10 in the case of the fixed block size, and is constituted as shown in FIG. 11 in the case of the adjustable block size. In the case of the fixed block size, in FIG. 10, user data header consisting of Separator 180, Type 181 and Word count 182 is placed (assigned) at the portion before User data 183 and End code 184 is placed (assigned) at the last portion thereof In the case of the adjustable block size, in FIG. 11, user data header consisting of type 181 is placed (assigned) at the portion before User data 183.

When the block type 157 is discriminated from adjustable block size, Separator. 180, End code 184, and Word count 182 are inserted in FIG. 11. Respective data blocks begin with Separator 180 and ends with End code 184. Value of the Separator 180 is 309h and value of End code 184 is 30Ah.

The Word count 182 is constituted by 4 words as shown in FIG. 12 and represents the number of user data words. This word count is C31 to C0:data, EP1: even parity with respect to C7 to C0, EP2: even parity with respect to C15 to C8, EP3: even parity with respect to C23 to C16, and EP4: even parity with respect to C31 to C24.

The Type 181 is the type for discriminating type of data stream and can have 256 different states. This type 181 consists of B7 to B0: data portion of lower order 8 bits, and parity portion consisting of B8: even parity with respect to B7 to B0 and B9: complement of B8.

Moreover, in the case where CRC flag is active, CRC105 is inserted into the last portion of the payload portion 104 as shown in FIG. 4A. The CRC105 is applicable to the entirety of the payload portion 104. In the case where the payload portion 104 is expanded, the CRC 105 is also applicable to expanded user data area. The generative polynomial with respect to the CRC105 is the same as the generative polynomial with respect to Header CRC and Line Number CRC.

Subsequently, reference frame signal will be described with reference to FIG. 13.

The timing reference signal 190 consists of "3FF, 000, 000" defined as synchronization word and data such as "XYZ", etc. defined as timing word. The synchronization word and the timing word are disposed (assigned) at the above-described EAV, SAV.

The reason why such synchronization word is used is as follows. In order to judge position of luminance information represented by corresponding picture data when viewed, e.g., from its content or the relationship with respect to data before and after in the case where data of B9 (MSB) to B0 (LSB) are serially sent, specific pattern uniquely determined is caused to be recognized to input information indicating position immediately after that pattern. Namely, pattern which does not appear by any means in the picture data is used as synchronization pattern. In the embodiment of this invention, combination of "3FF", "000" and "000" is used as synchronization pattern. The synchronization pattern data consisting of "3FF", "000" and "000" is data in which values of "1" are successive by ten and values of "0" are successive by twenty. There is no possibility that such pattern data does not appear at the ratio of 100%. Thus, there is no possibility by any means that the synchronization pattern in the embodiment of this invention is detected as if it is error for picture data. Since the timing word "XYZ" is disposed (assigned) immediately after synchronization word "3FF, 000, 000" securely detected in this way, such timing word can be securely detected without erroneous detection similarly to the synchronization word.

In the embodiment of this invention, specific information is defined as this timing word "XYZ". In more practical sense, "F" illustrated as the second upper order bit B8 of timing word "XYZ" 191 indicates the first field when it is "0" and indicates the second field when it is "1". In addition, "V" illustrated as the third upper order bit B7 of "XYZ" 191 of timing word indicates effective picture (time) period when it is "0" and indicates vertical blanking (time) period when it is "1". Accordingly, by making reference to the second upper order bit B8 and the third upper order bit B7 of "XYZ" 191 of this timing word, it is possible to discriminate whether that data is positioned at the first field or the second field, or is positioned at horizontal effective picture (time) period or vertical blanking (time) period.

Reference may be made to the second upper order bit B8 and the third upper bit as reference frame signal 192.

As explained above, SDTI format used in this embodiment is caused to be of configuration including EAV (End of Active Video) block, ancillary data block, the payload block, SAV (Start of Active Video) block, and CRCC (Cyclic Redundancy Check Code) block.

In this example, in the case where data of plural channels are caused to undergo transmission, such an approach is employed to respectively MPEG-encode the video data of plural channels to generate video data of plural channels to insert the video data of plural channels into the payload portion of SDTI to thereby generate video data converted into SDTI to multiplex the video data of plural channels converted into SDTI to thereby generate multiplexed video data of SDTI to carry out transmission of multiplexed data of SDTI.

Header data peculiar to the predetermined SDTI is inserted into the ancillary data block, and destination addresses indicating transmission destination of the video data of plural channels are set every the plural channels in the header data. Timing signal indicating signal processing timing of video data inserted into the payload portion is inserted into the EAV block and the SAV block, and the multiplexing unit (MUX) multiplexes the video data of the plural channels on the basis of the timing signal.

The timing signal is a signal synchronous with frame or field of the video data.

Moreover, this invention can be applied to encoded video data transfer reproduced at N times speed. At the transmitting unit side, such an approach is employed to reproduce encoded video data at N times speed to convert video data reproduced at N times speed into data of format for a predetermined serial transmission in order to carry out transmission at rate corresponding to the N times speed to carry out transmission of format-converted video data of N times speed at rate corresponding to the N times speed from the transmitting unit to the receiving unit, and to receive, at the receiving unit side, video data of N times speed which has been caused to undergo transmission at rate corresponding to the N times speed from the transmission means to record the received video data of N times speed at N times speed.

In this case, destination address indicating transmission destination of the video data and source address indicating transmission source of the video data are included within the header data in the SDTI format, and the same destination address and the same source address are set as header data corresponding to the payload portion in which video data of N times speed is inserted.

Timing signal indicating signal processing timing of video data inserted into the payload portion is inserted into the EAV block and the SAV block.

Explanation will be given in connection with more practical configuration of the SDTI encoder circuit section of the transmitting side for converting inputted data into data of SDTI format and for recording destination address information by the SDTI format, and the receiving side SDTI decoder circuit section for decoding SDTI format and for reading destination address information added by the SDTI format as described above.

The transmitting side circuit sections are respectively provided, e.g., at the output side of the above-described field site or the output side of transmitting units $21_1, 21_2, 21_3, 21_4$ which will be described later, and the receiving side circuit sections are respectively provided, e.g., at the input side of the above-described regional broadcast station or the input side of respective receiving sections $3_1, 3_2, 3_3, 3_4$ of the data receiving unit 1 which will be described later.

Figure 14:
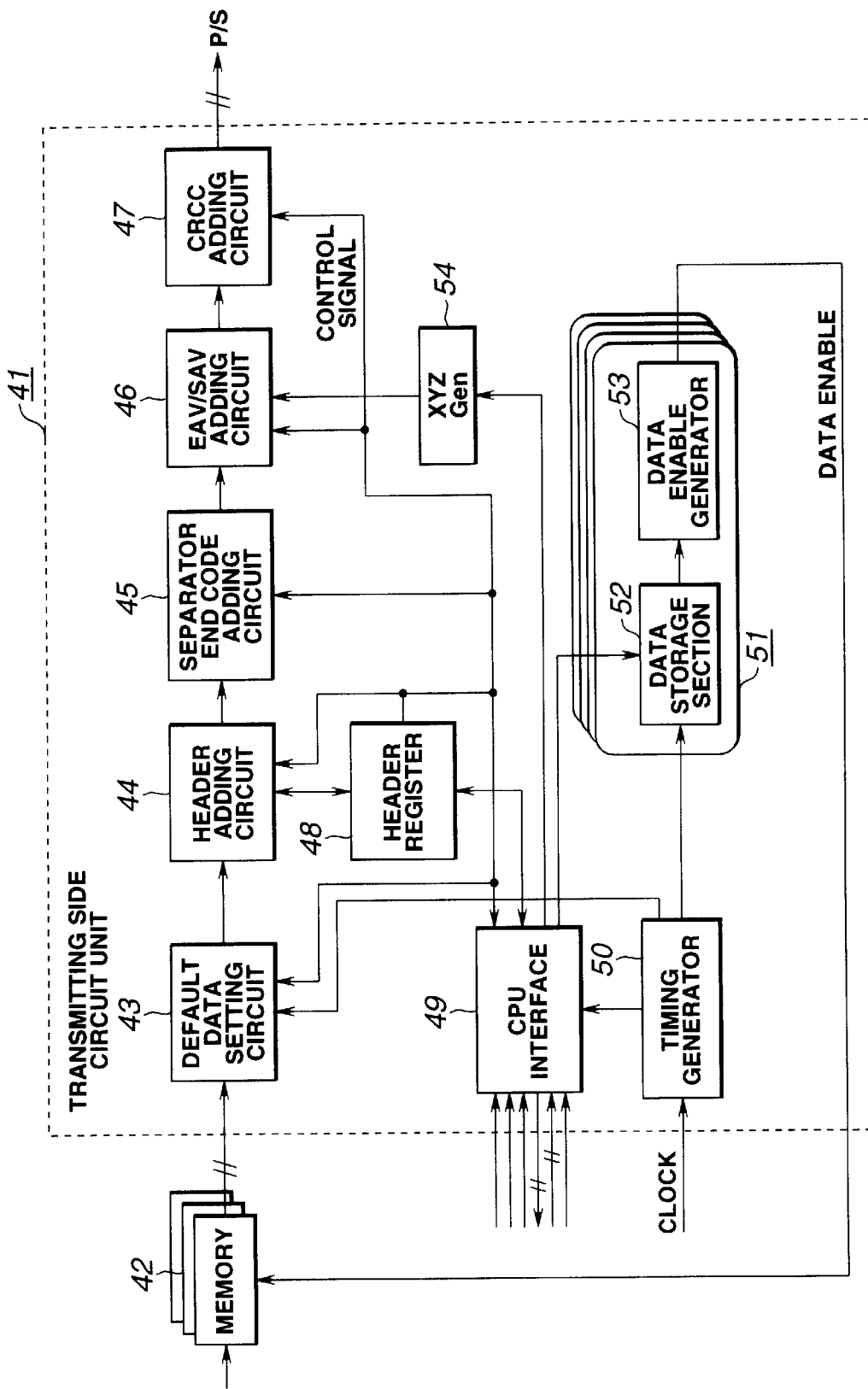
FIG. 14 is a circuit diagram showing transmitting side circuit section for adding destination address information to data.

As shown in FIG. 14, the transmitting side circuit section 41 comprises a memory 42 for temporarily storing data to be transmitted and adapted so that stored data is caused to undergo output control by data enable, a default data setting circuit 43 for setting default data with respect to data from the memory 42, a header register 48 for generating header, a header adding circuit 44 for adding header generated by header register 48 to the data outputted from the default data setting circuit 43, a separator end code adding circuit 45 for adding data type, word count and end code with respect to the corresponding header portion, etc. to header added to data outputted from the header adding circuit 44, an EAV/SAV adding circuit 46 for adding EAV and SAV, a CRCC adding circuit 45 for adding CRCC (Cyclic Redundancy Check Code), a timing generator 50 for outputting timing signal generated by the external clock to the default data setting circuit 43 and a data enable generating circuit 51, the data enable generating circuit 51 composed of a data storage section 52 for storing data such as data type, word type and start line, etc. and a data enable generator 53 for generating data enable for carrying out output control of data stored in the memory 42 on the basis of data within the data storage section 52, a CPU interface (CPU.I/F) 49 for outputting data, etc. from the CPU to a header register 48 or an information storage section 52, and an XYZ generator 54 for preparing XYZ word of EAV, SAV with respect to signal from the CPU interface 49.

The transmitting side circuit unit 41 constituted in this way adds header to data temporarily stored in the memory 42 to store destination address information, etc. into the header. By this transmitting side circuit unit 41, destination address information can be added to video signal inputted to the transmitting unit.

At this transmitting side circuit unit 41, respective sections are supplied with control signals from the CPU interface 49. Respective sections of the transmitting side circuit unit 41 execute processing on the basis of control of control signals from the CPU interface 49.

The operation at the transmitting side circuit unit 41 will be described later.

Figure 15:
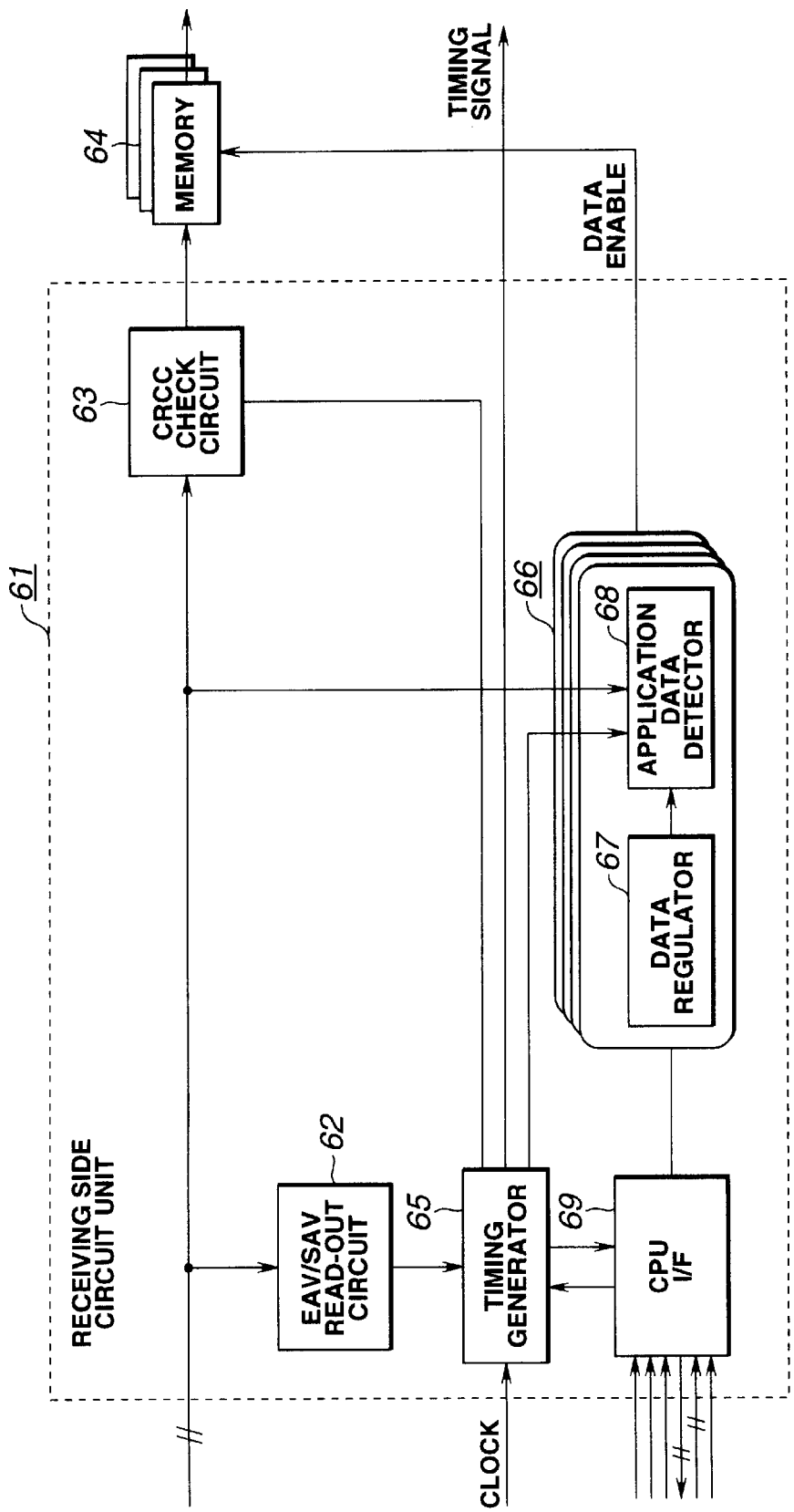
FIG. 15 is a circuit diagram showing receiving side circuit section for reading out destination address information added to data to selectively receive this data.

As shown in FIG. 15, a receiving side circuit unit 61 comprises an EAV/SAV reading circuit 62 for reading out EAV and SAV within the header added to inputted data, a CRCC check circuit 63 for checking CRCC within the header added to inputted data, a timing generator 65 for outputting timing signal generated by the external clock to a CRCC check circuit 63 and an application data detector 68, etc., a data enable generating circuit 66 comprised of a data regulator 67 supplied with receiving address and/or data type from the CPU and an application data detector 68 for reading out destination address information, etc. added to inputted data, a memory 64 for storing data outputted from the receiving side circuit unit 61, and a CPU interface (CPU.I/F) 69 for outputting receiving address, etc. from the CPU to the data enable generating circuit 66.

The data enable generating circuit 66 compares destination address information from the CPU inputted to the data regulator 67 with destination address information added to the inputted data that the application data detector 68 has read, whereby in the case where they are in correspondence with each other, it outputs data enable to the memory 64.

The receiving side circuit unit 61 thus constituted temporarily stores inputted data into the memory 64, whereby in the case where receiving address from the CPU and destination address information added to inputted data are in correspondence with each other, it outputs data from the memory 64. By this receiving side circuit unit 61, respective receiving sections of the data receiving unit 1 can selectively receive video signal.

The operation in the receiving side circuit unit 61 will now be described later.

The second embodiment of this invention will now be explained below.

The second embodiment relates to the data receiving unit for receiving data in order to repeat (relay) it, etc.

The data receiving unit 1 comprises an address information reading circuit 2 serving as destination information reading means for reading out all destination address information of input data, receiving sections $3_1, 3_2, \ldots, 3_{n-1}, 3_n$ serving as receiving means in which predetermined receiving addresses are set and adapted for receiving data of corresponding set one of the receiving addresses of input data, a CPU4 having an address setting function to set respective receiving addresses of the receiving sections $3_1, 3_2, \ldots, 3_{n-1}, 3_n$ on the basis of the destination address information that the address information reading circuit 2 has read, and a delay circuit 5 for delaying inputted data to output it.

In this example, data inputted to the data receiving unit 1 is constituted by the so-called serial data consisting of, e.g., multiplexed data group. Further, destination address information are added to respective data. For example, data is digital video signal or digital audio signal, etc.

The data receiving unit 1 is caused to be of configuration adapted to automatically receive, every destination, inputted data on the basis of destination address information of inputted respective data.

The address information reading circuit 2 reads out, with respect to all of inputted data, destination address information added to those data. Destination address information which has been read out by the address information reading circuit 2 is inputted to the CPU4. This address information reading circuit 2 reads out destination address information with respect to all of inputted data to output its destination address information to the CPU4.

The CPU4 sets respective receiving addresses of the receiving sections $3_1, 3_2, \ldots, 3_{n-1}, 3_n$ on the basis of the destination address information. Receiving addresses are set in correspondence with the destination address information. In this example, the processing of the CPU4 is caused to have intelligence function, thereby making it possible to cope with missing error signal, etc.

The delay circuit 5 is a circuit for delaying inputted data to output it. The delay circuit 5 has a function to delay time required until, e.g., at least address information reading circuit 2 reads out destination address information of inputted data and the CPU4 sets receiving addresses of the receiving sections $3_1, 3_2, \ldots, 3_{n-1}, 3_n$ on the basis of the read-out destination address information that the address information reading circuit 2 has read out.

The receiving sections $3_1, 3_2, \ldots, 3_{n-1}, 3_n$ receive only data in which destination address information in correspondence with receiving address set by the CPU4 is added.

As stated above, the data receiving unit 1 reads out destination address information of multiplexed and inputted respective data by the address information reading circuit 2 to set receiving addresses of the respective receiving sections $3_1, 3_2, \ldots, 3_{n-1}, 3_n$ by the CPU4 on the basis of the destination address information which has been read out. Thus, the data receiving unit 1 receives only data to which destination address information in correspondence with receiving addresses respectively set at the receiving sections $3_1, 3_2, \ldots, 3_{n-1}, 3_n$ are added. Thus, even if, e.g., multiplexed and inputted data takes any order in the data stream, respective receiving sections $3_1, 3_2, \ldots, 3_{n-1}, 3_n$ can selectively receive data.

Accordingly, the data receiving unit 1 can automatically receive, at the respective receiving sections $3_1, 3_2, \ldots, 3_{n-1}, 3_n$, inputted data without setting the receiving sections $3_1, 3_2, \ldots, 3_{n-1}, 3_n$ every destination of data in advance before data input in correspondence with destination address information added to inputted data.

For example, by this data receiving unit 1, data automatically received every respective destinations can be outputted to equipments of respective destinations.

Moreover, user can receive data without being conscious of destination of inputted data by using the data receiving unit 1, and can output received data to the equipments every respective destinations.

In this example, the data receiving unit 1 can receive data every destination by respective receiving sections $3_1, 3_2, \ldots, 3_{n-1}, 3_n$ without providing the delay circuit 5. In this case, respective receiving sections $3_1, 3_2, \ldots, 3_{n-1}, 3_n$ allow the CPU4 to set receiving addresses. Then, the respective receiving sections $3_1, 3_2, \ldots, 3_{n-1}, 3_n$ receive data every respective destinations.

Explanation will now be given by taking more practical example in connection with the data receiving unit 1.

Figure 16:
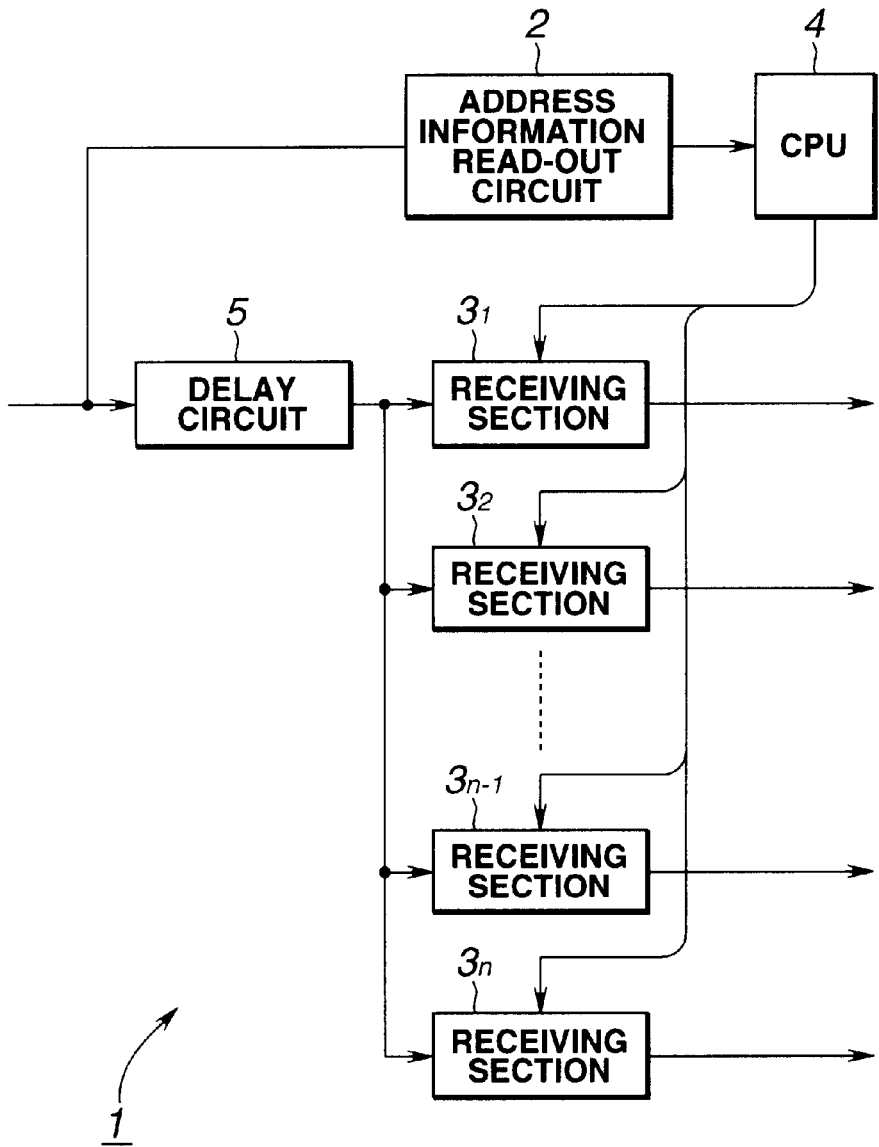
FIG. 16 is a circuit diagram showing data receiving unit serving as embodiment of this invention.
Figure 17:
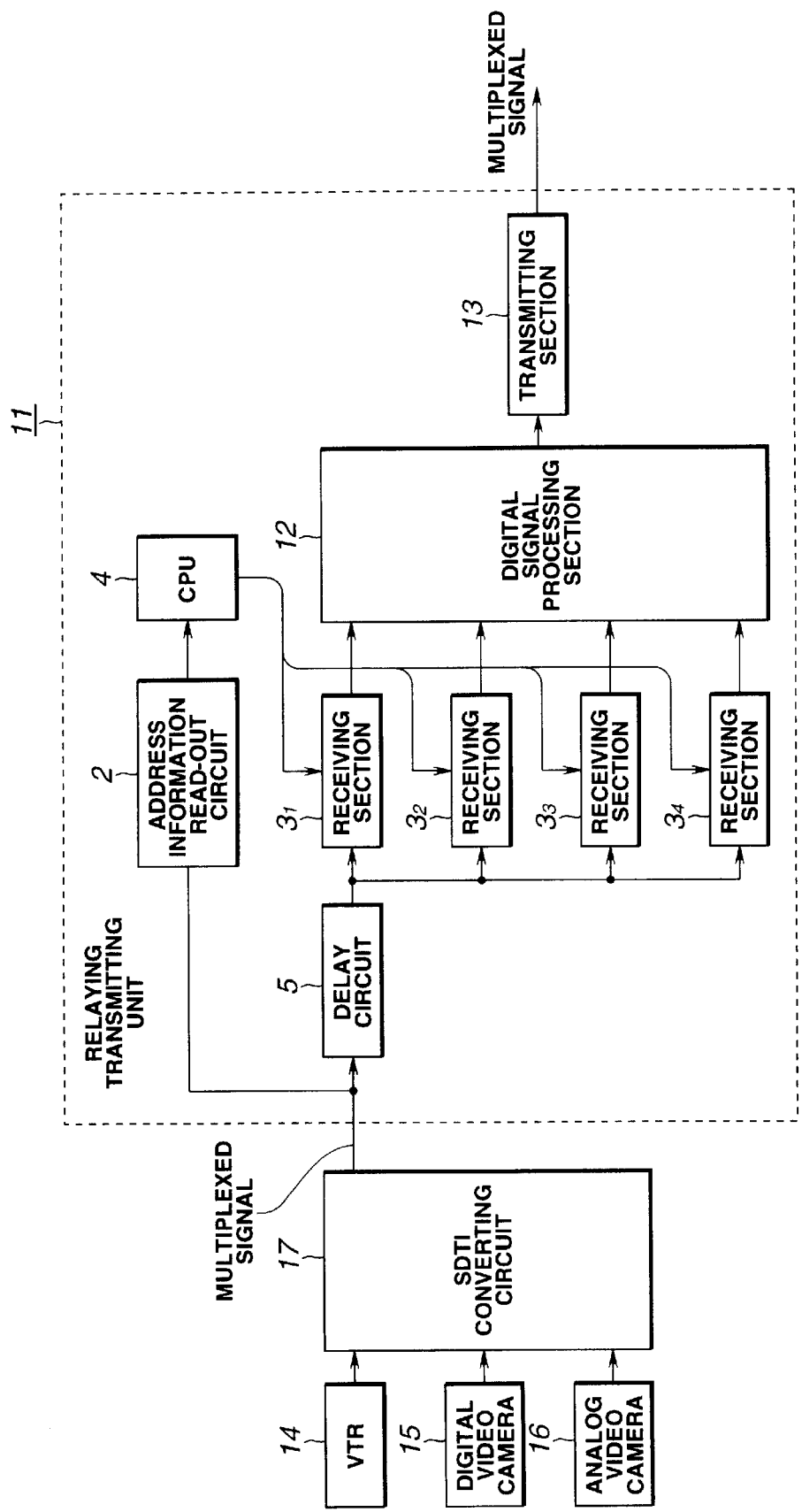
FIG. 17 is a circuit diagram showing the case where the data receiving unit is applied to relaying transmitting unit.

FIG. 17 shows the case where signals in which respective video signals transmitted from a VTR 14, a digital video camera 15 and an analog video camera 16 are converted into data of format to which destination address information like the so-called SDTI format is added are received, and shows the case where the data receiving unit 1 of FIG. 16 is applied to relaying transmitting unit 11.

Conversion into signals to which respective address information are added, e.g., signals of the SDTI format with respect to video signals transmitted from the VTR14, the digital video camera 15 and the analog video camera 16 is carried out by a SDTI converting circuit 17 connected at the preceding stage of the relaying (repeating) transmitting unit 11.

Similarly to the embodiment of the above-described data receiving unit 1, the relaying transmitting unit 11 comprises an address information reading circuit 2, receiving sections $3_1, 3_2, 3_3, 3_4$, a CPU4, and a delay circuit 5. In this case, the address information read-out circuit 2, the receiving sections $3_1, 3_2, 3_3, 3_4$, and the CPU4 and the delay circuit 5 have function similar to the function which has been explained in the above-described embodiment.

The relaying transmitting unit 11 comprises a digital signal processing section 12 for carrying out multiplexing and/or modulation, etc. with respect to video signal as signal processing means for carrying out conversion for sending video signals respectively outputted from the receiving sections $3_1, 3_2, 3_3, 3_4$ onto the transmission path, and a transmitting section 13 for sending signal outputted from the digital signal processing section 12 onto the transmission path.

The relaying transmitting unit 11 constituted in this way is supplied with respective video signals from VTR14, digital video camera 15 and analog video camera 16 in which addition processing of destination address information, etc. has been implemented by the SDTI converting circuit 17.

The SDTI converting circuit 17 serves to store video signal into transmission packet by SDTI format to add ancillary information including destination address information, etc. to video signal. In this case, the SDTI format may be constituted for the purpose of applying it to transmission of various signals except for video signal as well.

Figure 18:
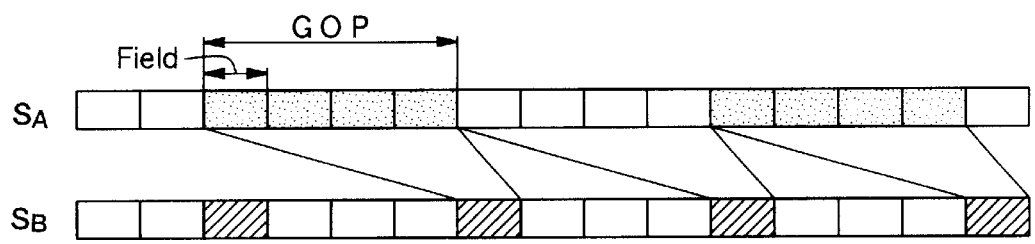
FIG. 18 is a data diagram showing the state when data is compressed.

In this example, the video signal is digitally compressed by employing, e.g., MPEG system. For example, digital compression is carried out at VTR14, digital video camera 15 and analog video camera 16. Thus, e.g., as indicated by $S_A$ and $S_B$ in FIG. 18, two frames (4 fields) ($S_A$) may be caused to be of configuration such that it is assembled ($S_B$) within one field time as one compression picture unit (GOP). Thus, one signal may be transmitted by one field/1 GOP so that simultaneous transmission of four signals or transmission of four times speed can be made.

Figure 19:
FIG. 19 is a multiplexed data diagram showing the state where signals A, B and C inputted to the relaying transmitting unit are multiplexed.

Further, the SDTI converting circuit 17 has a function to multiplex transmission packet within which video signal digitally compressed as described above is stored. The SDTI converting circuit 17 multiplexes transmission packet as shown in FIG. 19. In FIG. 19, since signal A appears twice within one findamental unit (two frames), i.e., is signal caused to undergo transmission at double speed and signals B and C have occurrence frequency of one time within the fundamental unit. Accordingly, this transmission is, e.g., the standard transmission. The signal A is video signal by, e.g., VTR14 and signals B and C are video signal by, e.g., digital video camera 15 and analog video camera 16.

Addition of destination address information by SDTI format is made by the SDTI converting circuit 17. Thus, the multiplexed video signal is outputted to the relaying transmitting unit 11.

Similarly to the data receiving unit 1 which is the above-described embodiment, the relaying transmitting unit 11 sets receiving addresses of respective receiving sections $3_1, 3_2, 3_3, 3_4$ by the CPU4 on the basis of destination address information added to inputted respective video signals. The relaying transmitting unit 11 receives, by the receiving sections $3_1, 3_2, 3_3, 3_4$, only video signals to which destination addresses information in correspondence with respective receiving addresses are added to output video signals every destinations.

Video signals every destination outputted from the receiving sections $3_1, 3_2, 3_3, 3_4$, are inputted to the digital signal processing section 12. The digital signal processing section 12 carries out signal processing, etc. with respect to inputted respective vide:o signals. Further, the receiving sections $3_1, 3_2, 3_3, 3_4$ multiplex video signals after undergone signal processing to further allow such multiplexed signal to undergo modulating processing to output it. Video signal multiplexed at the digital signal processing section 12 is outputted to the transmission path after undergone processing for sending it onto the transmission path by the transmitting section 13.

Even in the case where the data receiving unit 1 is used as the relaying (link) transmitting unit 11 as described above so that destination address information peculiar to video signals from the VTR14, the digital video camera 15 and the analog video camera 16 are not set, i.e., even in the case where destination address information are arbitrarily set, respective video signals can be automatically received without setting destinations of respective receiving sections $3_1, 3_2, 3_3, 3_4$ in advance before data is inputted.

Namely, even in the case where inherent destination address information is not determined at all times with respect to video signal transmitted from, e.g., VTR14, etc., respective video signals can be received by the relaying transmitting unit 11.

Moreover, user can receive, by using the relaying transmitting unit 11, without becoming aware of destination address information added to inputted video signal, respective video signals to which those destination address information have been added.

Further, the relaying transmitting unit 11 can automatically receive respective video signals to individually send respective video signals to the digital signal processing section 12, etc. to thereby carry out processing necessary for transmission. For example, in the case where transmission of transmit signal is carried out by transmission paths of different transmission formats, processing necessary for transmission can be suitably implemented, at the relaying transmitting unit 11, to video signals individually outputted from the receiving sections $3_1$, $3_2$, $3_3$, $3_4$.

Moreover in the case where transmission capacity of the transmission path is sufficiently large, even if there is employed a signal inputted by multi-channel/multi-speed such as SDTI format, the relaying transmitting unit 11 can automatically receive it to send the inputted signal onto the transmission path.

Figure 20:
FIG. 20 is a multiplexed data diagram showing the state where signals A, B, C, D and E inputted to the relaying transmitting unit are multiplexed.

In this example, even in the case where signal A, signal B, signal C, signal D and signal E are all multiplexed as shown in FIG. 20, the relaying transmitting unit 11 functions. The CPU5 sets, e.g., receiving addresses of the receiving sections $3_1$, $3_2$, $3_3$, $3_4$ in order in correspondence with inputted various signals. Namely, in the case where consideration is made in terms of kind of signal in FIG. 20, signal A, signal B, signal C, signal D and signal E are inputted to the relaying transmitting unit 11 in order recited. Accordingly, receiving address of the receiving section $3_1$ is set in correspondence with signal A, receiving address of the receiving section $3_2$ is set in correspondence with signal B, receiving address of the receiving section $3_3$ is set in correspondence with signal C, and receiving address of the receiving section $3_4$ is set in correspondence with signal D.

Thus, by four receiving sections $3_1$, $3_2$, $3_3$, $3_4$, signal A, signal B, signal C and signal D are received and signal E is not received. For example, even in the case where signals of plural destinations are inputted in a manner as stated above, the number of receiving sections is limited, thereby making it possible to use transmission means limited in the transmission capacity. On the other hand, in the case where signal E is received, one receiving section is supplemented so that transmission can be made.

In this example, receiving address of the receiving section can be changed with predetermined setting updating (time) period, thereby making it possible to receive newly inputted signal in place of signal which is not inputted at present. Thus, in FIG. 20, for example, signal E can be received in place of signal B.

Figure 21:
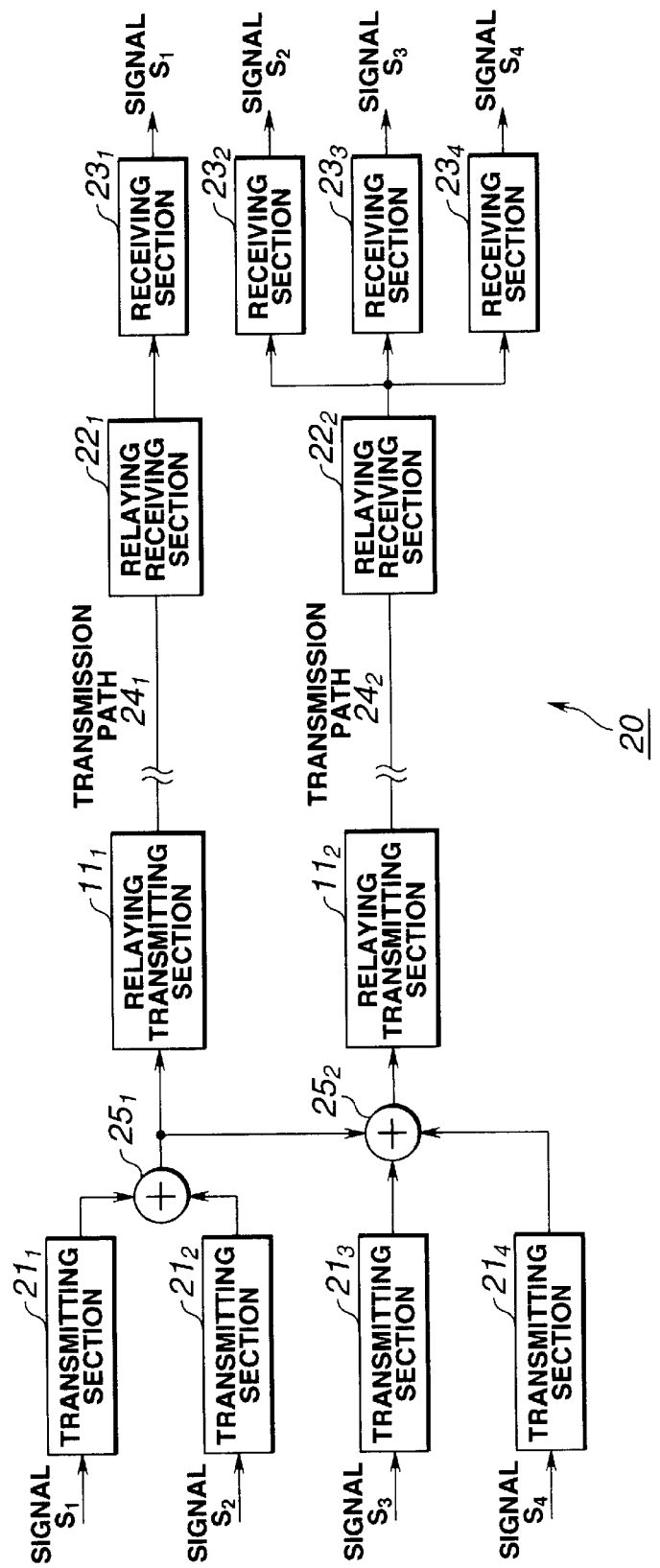
FIG. 21 is a block diagram showing data transmission system to which the relaying transmitting unit is applied.

The relaying transmitting unit 11 constituted as described above may be provided within the data transmission system 20 as shown in FIG. 21.

The data transmission system 20 includes, at the data transmitting side, transmitting sections $21_1$, $21_2$, $21_3$, $21_4$, a mixing circuit $25_1$ for multiplexing signals S1, S2 outputted from the transmitting sections $21_1$, $21_2$, a mixing circuit $25_2$ for multiplexing signals S1, S2, S3, S4 outputted from the transmitting sections $21_1$, $21_2$, $21_3$, $21_4$, a relaying transmitting section $11_1$ for relaying signal multiplexed at the mixing circuit $25_1$ to transmit it, and a relaying transmitting section $11_2$ for relaying signal multiplexed at the mixing circuit $25_2$ to transmit it. Moreover, the data transmission system 20 includes, at the data receiving side, relaying receiving sections $21_1$, $21_2$, a receiving section $23_1$ supplied with signal outputted from the relaying receiving section $22_1$, and receiving sections $21_2$, $21_3$, $21_4$ supplied with signal outputted from the relaying receiving section $22_2$.

Further, at the data transmission system 20, the relaying transmitting section $11_1$ and the relaying receiving unit $22_1$ are connected by a transmission path $24_1$, and the relaying transmitting unit $11_2$ and the relaying receiving unit $22_2$ are connected by a transmission path $24_2$.

In this example, at the transmission paths $24_1$, $24_2$, respective transmission capacities are suitably set. In this case, e.g., the transmission path $11_1$ has transmission capacity corresponding to signal transmission of 2 channels, and the transmission path $24_2$ has transmission capacity corresponding to signal transmission of 4 channels.

In addition, it is assumed that the relaying transmitting section $11_1$ comprises, e.g., two receiving sections, and the relaying transmitting section $11_2$ comprises four receiving sections as shown in FIG. 17, for example.

Explanation will now be given in connection with the cases, in the data transmission system 20 constituted in this way, e.g., signal S1 inputted to the transmitting section $21_1$ is transmitted to the receiving section $23_2$, signal S2 inputted to the transmitting section $21_2$ is transmitted to the receiving section $23_4$, signal S3 inputted to the transmitting section $21_3$ is transmitted to the receiving section $23_4$, and signal S4 inputted to the transmitting section $21_4$ is transmitted to the receiving section $23_3$.

The transmitting sections $21_1$, $21_2$, $21_3$, $21_4$ add destination address information to inputted respective signals. The transmitting sections $21_1$, $21_2$, $21_3$, $21_4$ add respective destination address information to the respective signals S1, S2, S3, S4 on the basis of, e.g., the above-described SDTI format. Respective signals to which destination address information are added by the transmitting sections $21_1$, $21_2$, $21_3$, $21_4$ are inputted to relaying transmitting sections $11_1$, $11_2$ through a mixing circuit $25_1$ and a mixing circuit $25_2$. In this example, the transmitting sections $21_1$, $21_2$, $21_3$, $21_4$ may comprise, e.g., VTR, digital video camera, etc. as described above therewithin. In this case, they serve to add destination address information to output signal from VTR or digital video camera, etc. within the unit to output it, e.g., as signal of SDTI format.

In this case, signal S1 and signal S2 from the transmitting section $21_1$ and the transmitting section $21_2$ are multiplexed at the mixing circuit $25_1$, and the multiplexed output is inputted to the relaying transmitting section $11_1$. Moreover, signal S1, signal S2, signal S3 and signal S4 from the transmitting section $21_1$, the transmitting section $21_2$, the transmitting section $21_3$ and the transmitting section $21_4$ are multiplexed by the mixing circuit $25_2$, and multiplexed signal is inputted at the relaying transmitting section $11_2$.

The relaying transmitting section $11_1$ and the relaying transmitting section $11_2$ are caused to be of configuration such that reception can be automatically carried out as described above. Namely, the relaying transmitting section $11_1$ and the relaying transmitting section $11_2$ set receiving addresses of respective receiving sections on the basis of destination address information added to inputted data to automatically receive inputted signals every destination by the respective receiving sections to carry out signal processing, etc. by the digital signal processing section and the transmitting section to output it as multiplexed signal for a second time.

Thus, the relaying transmitting section $11_1$ automatically receives signal S1 and signal S2 from the transmitting section $21_1$ and the transmitting section $21_2$ multiplexed and inputted to output them to the transmission path $24_1$. Moreover, the relaying transmitting section $11_2$ automatically receives signal S1, signal S2, signal S3 and signal S4 from the transmitting section $21_1$, the transmitting section $21_2$, the transmitting section $21_3$ and the transmitting section $21_4$ which are multiplexed and inputted to output them to the transmission path $24_2$.

Then, signal sent through the transmission path $24_1$, is received at the relaying receiving section $22_1$, e.g., multiplexed signal of SDTI format is inputted to the receiving section $23_1$, signal sent through the transmission path $24_2$ is received at the relaying receiving section $22_2$, and, e.g., multiplexed signal of SDTI format is inputted to the receiving sections $23_2$, $23_3$, $23_4$.

The receiving sections $23_1$, $23_2$, $23_3$, $23_4$ receive only signals transmitted toward own sections within multiplexed signal, which are respectively inputted. For example, the receiving sections $23_1$, $23_2$, $23_3$, $23_4$ selectively receive only signals sent to own sections by destination address information added to respective signals.

As described above, the receiving sections $23_1$, $23_2$, $23_3$, $23_4$ can receive signal S2, signal S1, signal S4 and signal S3 respectively sent to own sections within the signals that the transmitting sections $21_1$, $21_2$, $21_3$, $21_4$ have transmitted.

In accordance with such system, even if destination address information of signals inputted to the respective relaying transmitting sections $11_1$, $11_2$ are changed, receiving addresses of respective receiving sections are automatically set by the CPU so that changed receiving addresses are respectively provided. Thus, automatic reception can be made. It is to be noted that, as more practical example where the destination address information is changed, the case where transmitting sections connected to the relaying transmitting sections $11_1$, $11_2$ are changed and/or the case where new transmitting section is added are mentioned.

For example, even in the data transmission system 20, even in the case where any one of transmitting sections $21_1$, $21_2$, $21_3$, $21_4$ of the transmitting side is changed into other transmitting section, the relaying transmitting section $11_1$ and the relaying transmitting section $11_2$ can automatically receive transmit signal from the changed transmitting section. For this reason, the receiving sections $23_1$, $23_2$, $23_3$, $23_4$ of the receiving side can receive even signals transmitted from the changed transmitting sections.

Moreover, in the data transmission system 20, even in the case where, e.g., the transmitting section is newly added, since the relaying transmitting section $11_1$ and the relaying transmitting section $11_2$ automatically receive only receiving signals by the number of receiving sections, transmit signal is caused to undergo transmission in correspondence with transmission capacity of the transmission path at all times. Namely, in the data transmission system 20, since the transmission capacity of the transmission path is not sufficient, in the case where transmission of signal is selectively carried out, the relaying transmitting section $11_1$, and the relaying transmitting section $11_2$ effectively act.

Figure 22:
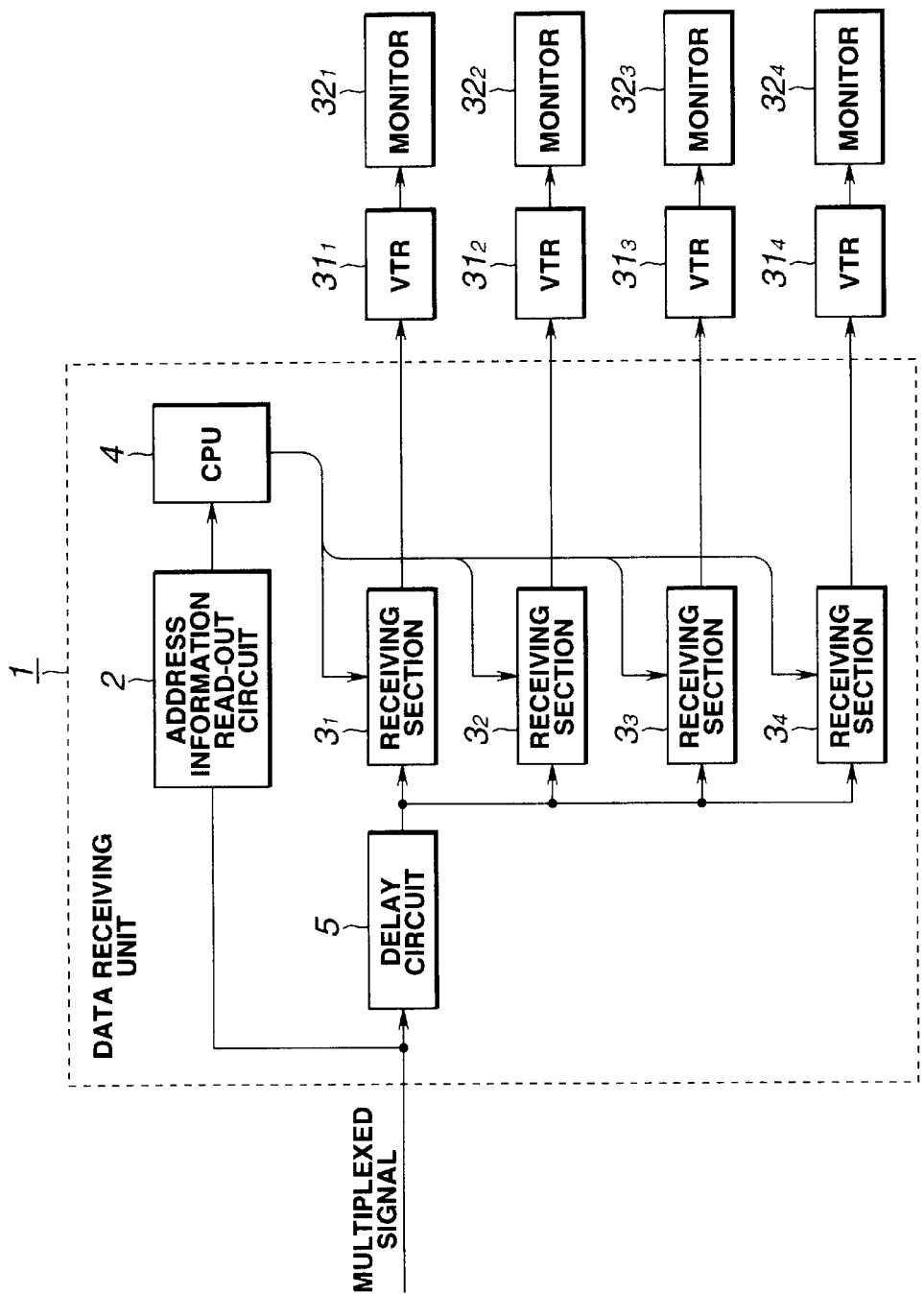
FIG. 22 is a block diagram showing the case where video signal is transmitted by plural VTRs and monitors by the data receiving unit.

Further, FIG. 22 shows the configuration in the case where inputted signals are imaged on plural monitors in the state where various video signals are multiplexed as other applied example of the data receiving unit 1. In this case, as shown in FIG. 22, the data receiving unit 1 is adapted so that plural VTRs $31_1$, $31_2$, $31_3$, $31_4$, and monitors $32_1$, $32_2$, $32_3$, $32_4$ are disposed at the output side thereof In this case, VTRs $31_1$, $31_2$, $31_3$, $31_4$ are respectively connected to the receiving sections $3_1$, $3_2$, $3_3$, $3_4$ of the data receiving unit 1.

The data receiving unit 1 selects any one of various video signals on the basis of destination address information added to various video signals constituting inputted multiplexed signal to output it to respective ones of the VTRs $31_1$, $31_2$, $31_3$, $31_4$ of the succeeding stage. Video signals inputted to the VTRs $31_1$, $31_2$, $31_3$, $31_4$ are recorded onto, e.g., recording medium, and are outputted to the monitors $32_1$, $32_2$, $32_3$, $32_4$.

By using the data receiving unit 1 in this way, it is possible to output inputted respective video signals to the respective VTRs $31_1$, $31_2$, $31_3$ and $31_4$ even if destination address information is employed.

Even if, e.g., destination address information of video signals inputted to the data receiving unit 1 are not known in advance, since they can be automatically received by the receiving sections $3_1$, $3_2$, $3_3$, $3_4$, it is possible to output the video signals automatically received from respective ones of the receiving sections $3_1$, $3_2$, $3_3$, $3_4$ to respective VTRs $31_1$, $31_2$, $31_3$, $31_4$.

Moreover, when, e.g., receiving address change setting function is provided, even if destination address of video signal inputted to the data receiving unit 1 is changed, receiving address of the receiving section is changed into destination address of video signal newly inputted from destination address of video signal which is not received at present, thereby making it possible to output the changed video signal to VTR connected to the receiving section in which the receiving address has been changed.

Further, it is unnecessary that, e.g., user grasps in advance destinations of respective video signals inputted to the respective VTRs $31_1$, $31_2$, $31_3$, $31_4$.

The operation of transmission and reception of data by the SDTI format will now be described.

Initially, an example of transmission of data by SDTI format will be described with reference to transmitting side circuit section 41 shown in FIG. 14.

SDTI header data packet consisting of 53 words is added to data delivered from the external. The SDTI format including this header data packet has been already described above.

At the transmitting side circuit section 41, header register 48 is provided in order to store SDTI header data prescribed at SMPTE 305M. This SDTI header data is delivered to header register 48 through CPU interface 49 from the CPU.

The header adding circuit 44 adds SDTI header data packet consisting of 53 words to the delivered data.

At the transmitting side circuit section 41, there is provided EAV/SAV circuit 46 for adding EAV/SAV. The EAV/SAV adding circuit 46 is a circuit for newly adding EAV/SAV to the data to which SDTI header has been added.

The transmitting side circuit section 41 comprises an XYZ word generator (Gen) 54 (not shown) for generating XYZ word. The XYZ word generating circuit 54 is a circuit for generating XYZ word of EAV/SAV. The XYZ word generated at this XYZ word generating circuit 54 is added to the data to which SDTI header has been added.

The transmitting side circuit section 41 comprises a CRCC adding circuit 47 for adding CRCC (Circular Redundancy Correcting Code). The CRCC adding circuit 47 generates CRCC with respect to added header data and data of video/audio of payload to add it.

Moreover, the transmitting side circuit section 41 comprises a synchronizing signal generating circuit for generating synchronizing signal. The synchronizing signal generating circuit generates a synchronizing signal for controlling respective circuits from F/V/H flag.

Subsequently, an example of transmission of data by SDTI format will be described with reference to the receiving side circuit section 61 shown in FIG. 15.

The timing generator 65 is a circuit for extracting timing signal from input data EAV/SAV information. In more practical sense, the timing generator 65 is operative so that in the case where EAV/SAV is added to input data, EAV/SAV information of input data is extracted at the EAV/SAV reading circuit 62 to make reference to flag "F", "V" and "H" within XYZ word registered as timing reference signal with respect to this extracted EAV/SAV.

By making reference to this flag "F", it is possible to discriminate whether video data stored at the payload portion is present at even field or odd field.

By making reference to this flag "V", it is possible to discriminate whether video data stored in the payload portion is data of effective pixel (time) period or data of vertical blanking (time) period.

Moreover, by making reference to this flag "H", it is possible to discriminate whether word XYZ to which reference is made at present is EAV or SAV.

As explained above, in this embodiment, data is transmitted by SDTI format. In transmission of data, header addition to add header data to the encoded video data is carried out to generate flag data indicating timing signal. Thus, timing signal for adding that flag data to the EAV block and the SAV block of the video data is added, and CRCC data is added to video data.

Moreover, inputted video data is encoded every 1 GOP (group of pictures) on the basis of MPEG (Moving Picture Experts Group) standard. At the multiplexing section, multiplexing processing of the video data of plural channels is implemented with the period corresponding to 1 GOP being as one sequence.

More practical data of SDTI format in this embodiment will now be described.

Initially, explanation will be given with reference to FIG. 23 in connection with bit stream in which four channels are multiplexed.

Figure 23:
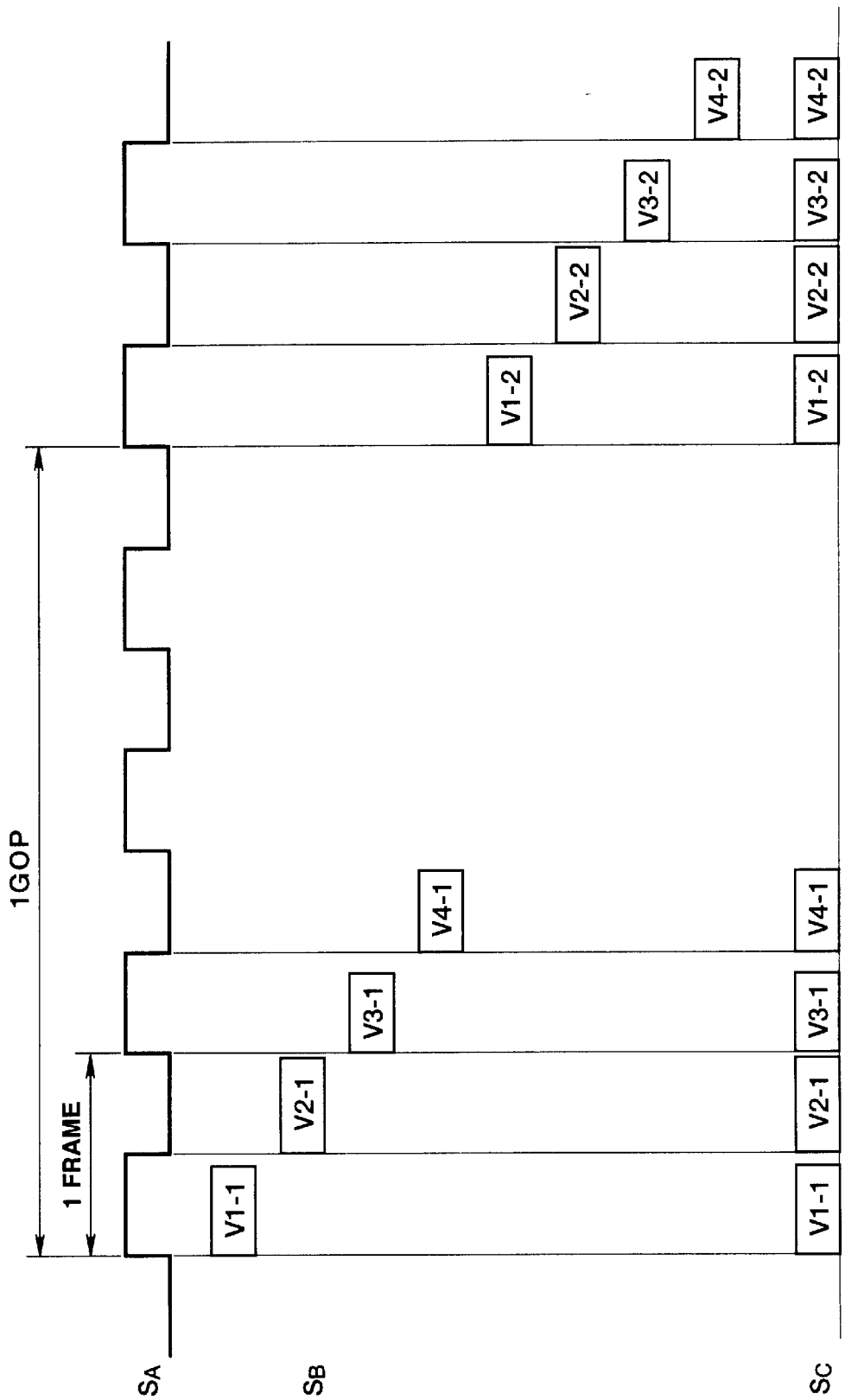
FIG. 23 is a timing chart for explaining actual example of the case where video data of 4 channels are multiplexed.

In reference frame signal $S_A$ in FIG. 23, one (time) period corresponds to one frame.

In this embodiment, group of pictures (GOP) which is unit of encoding of picture consists of 4 frames, and corresponds to four (time) periods of reference frame signal.

In more practical sense, GOP consists of four frames of I (intra) picture which is intraframe encoded picture, Bidirectional reference picture B in which reference is made to pictures in both directions of forward direction and backward direction in display order, P picture which is forward direction (predictional) reference picture in which reference is made to forward direction in display order, and B picture.

As indicated by $S_B$ in FIG. 23, respective GOPs are disposed within one field (0.5 frame) in the state compressed into, e.g., about 1/8 to 1/10.

As in the case of the first bit stream "V1-1" corresponding to data of 1 GOP of the first channel, the first bit stream "V2-1" of the second channel, the first bit stream "V3-1" of the third channel, and the first bit stream "V4-1" of the fourth channel, those bit streams are disposed in order of time with rising and falling every half period of the reference frame signal being respectively as initial points.

When four frame period corresponding to 1 GOP of the reference frame signal is passed from the initial point of the first bit stream "V1-1" of the first channel, the second bit stream "V1-2" of the first channel, the second bit stream "V2-2" of the second channel, the second bit stream "V3-2" of the third channel and the second bit stream "V4-2" of the fourth channel are similarly disposed.

Sc in FIG. 23 is signal in which four channels disposed as described above are disposed in order of time as SDTI stream. In this case, Sc is SDTI bit stream in which signals of 4 channels are multiplexed.

In more practical sense, succeedingly (subsequently) to the first bit stream "V1-1" of the first channel, the first bit stream "V2-1" of the second channel, the first bit stream "V3-1" of the third channel, and the first bit stream "V4-1" of the fourth channel, the second bit stream "V1-2" of the first channel, the second bit stream "V2-2" of the second channel, the second bit stream "V3-2" of the third channel and the second bit stream "V4-2" of the fourth channel are disposed from the next GOP period.

Lengths in point of time of the above-described respective bit streams are different every bit stream in general by difference of compression factor, etc.

Subsequently, four times speed transmission for carrying out transmission at speed four times greater than normal (ordinary) speed will now be described with reference to FIG. 24. The four times speed transmission is applied to the case where, e.g., four times recordable/reproducible digital VTR is used to carry out transmission of video data reproduced at four times speed, etc.

Figure 24:
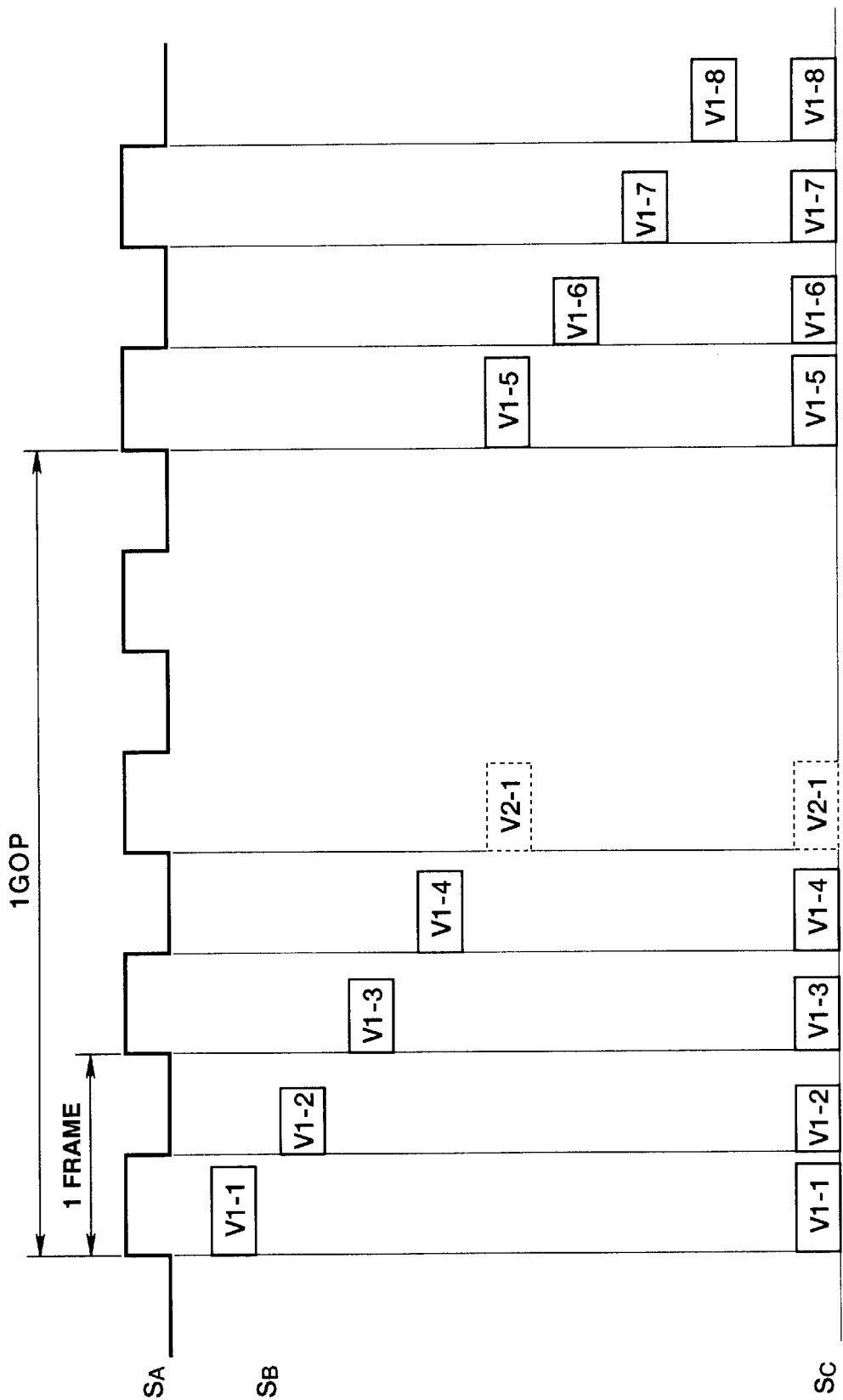
FIG. 24 is a timing chart for explaining actual example of the case where video data of four times speed is caused to undergo transmission.

At reference frame signal $S_A$ in FIG. 24, one period corresponds to one frame.

In this embodiment, group of pictures (GOP) which is unit of encoding of picture consists of 4 frames, and corresponds to four periods of reference frame signal.

In more practical sense, GOP consists of four frames of I picture, B picture, P picture and B picture.

As indicated by $S_B$ in FIG. 24, since respective GOPs are disposed within one field (0.5 frame), e.g., at about 1/8 to 1/16, bit streams are disposed in order of time with rising and falling every half period of reference frame signal being respectively as initial points as in the case of the first bit stream "V1-1" corresponding to data of one GOP of the first channel, the second bit stream "V1-2" of the first channel, the second bit stream "V1-3" of the first channel and the fourth bit stream "V1-4" of the first channel.

When four frame (time) period corresponding to one GOP of reference frame signal is passed from the initial point of the first bit stream "V1-1" of the first channel, the fifth bit stream "V1-5" of the first channel, the sixth bit stream "V1-6" of the first channel, the seventh bit stream "V1-7" of the first channel and the eighth bit stream "V1-8" of the first channel are similarly disposed.

In this case, in this SDTI bit stream, an approach may be employed to carry out transmission of video data of other channels in the multiplexed state along with video data of the first channel of four times speed to arrange, e.g., the first bit stream "V2-1" of the second channel subsequently to the fourth bit stream "V1-4" of the first channel.

Sc in FIG. 24 is a signal in which respective bit streams of the first channel disposed as described above are disposed in order of time as SDTI stream. In this case, this stream is SDTI bit stream in which signals of the first channel are multiplexed at four times speed.

In more practical sense, subsequently to the first bit stream "V1-1" of the first channel, the second bit stream "V1-2" of the first channel, the third bit stream "V1-3" of the first channel, and the fourth bit stream "V1-4" of the first channel, the fifth bit stream "V1-5" of the first channel, the sixth bit stream "V1-6" of the first channel, the seventh bit stream "V1-7" of the first channel, and the eighth bit stream "V1-8" of the first channel are disposed from the next GOP period.

It is to be noted that lengths in point of time of respective bit streams are different every bit stream in general by difference of compression factor, etc.

As described above, in the embodiment of this invention, destination address transmitted along with video data by multiplexed SDTI format is extracted to respectively set suitable destination addresses from the extracted destination addresses with respect to plural SDTI decoders.

Moreover, in the transmission system caused to be of configuration including transmitting side for transmitting video data and receiving side for receiving video data transmitted from the transmitting side, the transmitting side encodes the video data to carry out high speed reproduction for reproducing encoded video data at N times speed to carry out formatting for carrying out conversion of video data of N times speed reproduced at high speed into data of format for a predetermined serial transmission in order to carry out transmission thereof at the N times speed, and the receiving side receives video data of N times speed transmitted at rate corresponding to N times speed to record, at N times speed, the received video data of N times speed.

Further, conversion into SDTI format of data is carried out by adding header data to encoded video data to generate flag data indicating timing signal to add its flag data to the EAV block and the SAV block of the video data so that CRCC data is provided.

As described above, the data receiving unit according to this invention comprises destination information reading means for reading out all destination address information of input data, receiving means in which predetermined receiving addresses are set and adapted for receiving data of corresponding set one of the receiving addresses within input data, and address setting means for setting receiving address at receiving means on the basis of the destination address information that the destination information reading means has read out, thereby making it possible to automatically receive data every destination by the receiving means in which receiving addresses are set by the address setting means on the basis of destination address information that the destination information reading means has read out.

Thus, the data receiving unit suitably sets receiving address of receiving means in correspondence with destination address information added to input data. For this reason, it becomes unnecessary to set receiving means every destination of data in advance before data is inputted.

Moreover, by the data receiving unit, user can receive data every respective destinations without being aware of destination of inputted data to transmit the received data to, e.g., the equipment of the external.

A data receiving method according to this invention comprises a destination information reading step of reading out all destination address information of input data, an address setting step of setting receiving address of the receiving unit on the basis of destination address information which has been read out at the destination information reading step, and a receiving step of receiving data of set receiving address of the input data by the receiving unit set to a predetermined receiving address at the address setting step, thereby making it possible to automatically receive data every destination at the receiving step by the receiving means in which receiving addresses are set at the address setting step on the basis of destination address information which has been read out at the destination information reading step.

Thus, since the data receiving method suitably sets receiving address of receiving means in correspondence with destination address information added to input data, it becomes unnecessary to set receiving means every destination of data in advance before data is inputted.

In addition, by the data receiving method, user can receive, without being aware of destination of inputted data, data every respective destinations to transmit the received data to, e.g., the equipment of the external.

What is claimed is:

1. A transmission system adapted for carrying out transmission of video data of plural channels, the transmission system comprising:

encoding means for respectively encoding the video data of plural channels;

format converting means for inserting video data of plural channels encoded by the encoding means into payload portion of a predetermined serial transmission format to thereby convert format of the video data of plural channels, each of said plural channels comprising destination address information to be received at a relaying transmitting unit, and to be converted into destination address information conforming to destinations at a plurality of receiving sections without setting each respective receiving section thereof to specifically receive data from a particular predetermined channel before said destination address information is embedded into the video data;

multiplexing means for multiplexing video data of plural channels which have been subjected to format conversion by the format converting means; and transmission means for carrying out transmission of data multiplexed by the multiplexing means.

2. A transmission system as set forth in claim 1, wherein the predetermined serial transmission format is caused to be of configuration including EAV (End of Active Video) block, ancillary data block, the payload block, SAV (Start of Active Video) block, and CRCC (Cyclic Redundancy Check Code) block.

3. A transmission system as set forth in claim 2, wherein header data peculiar to the predetermined serial transmission format is inserted into the ancillary data block.

4. A transmission system as set forth in claim 3, wherein the header data is adapted so that destination addresses indicating transmission destinations of the video data of plural channels are set every the plural channels.

5. A transmission system as set forth in claim 2, wherein timing signal indicating signal processing timing of video data inserted into the payload portion is inserted into the EAV block and the SAV block, and wherein the multiplexing means multiplexes the video data of plural channels on the basis of the timing signal.

6. A transmission system as set forth in claim 5, wherein the timing signal is a signal synchronous with frame or field of the video data.

7. A transmission system as set forth in claim 5, wherein the format converting means includes header adding means for adding the header data to the encoded video data;

timing signal adding means for generating flag data indicating the timing signal to add that flag data to the EAV block and the SAV block of the video data, and CRCC data adding means for adding the CRCC data to the video data.

8. A transmission system as set forth in claim 7, wherein the encoding means is means for encoding the video data every 1GOP (group of pictures) on the basis of the MPEG (Moving Picture Experts Group) standard, and wherein the multiplexing means carries out multiplexing processing of the video data of plural channels with the time period corresponding to the 1 GOP being as one sequence.

9. A transmission system as set forth in claim 8, wherein the encoding means, the format converting means, the multiplexing means and the transmission means are provided at the transmitting side, and wherein the receiving side for receiving multiplexed video data transmitted from the transmitting side includes receiving means for receiving the multiplexed video data of the predetermined serial transmission format transmitted from the transmission means of the transmitting side, format converting means for converting the multiplexed video data into data of the same data format as data format of the encoded video data, and decoding means for decoding video data which has been caused to undergo format conversion by the format converting means.

10. A transmission system adapted for carrying out transmission of video data of plural channels, the transmission system comprising:

encoding means for respectively encoding the video data of plural channels;

format converting means for inserting video data of plural channels encoded by the encoding means into payload portion of a predetermined serial transmission format to thereby convert format of the video data of plural channels;

multiplexing means for multiplexing video data of plural channels which have been subjected to format conversion by the format converting means; and transmission means for carrying out transmission of data multiplexed by the multiplexing means;

wherein the predetermined serial transmission format is caused to be of configuration including:

EAV (End of Active Video) block, ancillary data block, the payload block,

SAV (Start of Active Video) block, and

CRCC (Cyclic Redundancy Check Code) block;

wherein timing signal indicating signal processing timing of video data inserted into the payload portion is inserted into the EAV block and the SAV block;

wherein the multiplexing means multiplexes the video data of plural channels on the basis of the timing signal;

wherein the format converting means includes:

header adding means for adding the header data to the encoded video data;

timing signal adding means for generating flag data indicating the timing signal to add that flag data to the EAV block and the SAV block of the video data; and CRCC data adding means for adding the CRCC data to the video data;

wherein the encoding means is means for encoding the video data every 1 GOP (group of pictures) on the basis of the MPEG (Moving Picture Experts Group) standard;

wherein the multiplexing means carries out multiplexing processing of the video data of plural channels with the time period corresponding to the 1 GOP being as one sequence;

wherein the encoding means, the format converting means, the multiplexing means and the transmission means are provided at the transmitting side;

wherein the receiving side for receiving multiplexed video data transmitted from the transmitting side includes:

receiving means for receiving the multiplexed video data of the predetermined serial transmission format transmitted from the transmission means of the transmitting side;

format converting means for converting the multiplexed video data into data of the same data format as data format of the encoded video data; and decoding means for decoding video data which has been caused to undergo format conversion by the format converting means;

wherein the format converting means of the receiving side is caused to be of configuration including plural format converting circuits corresponding to the plural channels; and wherein the plural format converting circuits are caused to be of configuration adapted to process only video data of channels in correspondence with destination addresses respectively set at the individual format converting circuits from the received multiplexed video data.

11. A transmission system as set forth in claim 10, wherein destination addresses which have been caused to undergo transmission along with the multiplexed video data are extracted to respectively set suitable destination addresses from the extracted destination addresses with respect to the plural format converting circuit.

12. A transmission system caused to be of configuration including a transmitting unit for transmitting video data of plural channels, and a receiving unit for receiving video data transmitted from the transmitting unit, the transmitting unit including encoding means for encoding the video data of plural channels, high speed reproducing means for reproducing, at N times speed, video data encoded by the encoding means, format converting means for converting video data of plural channels of N times speed reproduced by the high speed reproducing means into data of format for a predetermined serial transmission in order to carry out transmission at rate corresponding to the N times speed, each of said plural channels comprising destination address information to be received at a relaying transmitting unit, and to be converted into destination address information conforming to destinations at a plurality of receiving sections without setting each respective receiving section thereof to specifically receive data from a particular predetermined channel before said destination address information is embedded into the video data, and transmission means for carrying out transmission of data which has been caused to undergo format conversion by the format converting means at rate corresponding to the N times speed, the receiving unit including receiving means for receiving video data of N times speed which has been caused to undergo transmission at rate corresponding to the N times speed from the transmission means, and high speed recording means for recording, at N times speed, the received video data of N times speed.

13. A transmission system as set forth in claim 12, wherein the predetermined serial transmission format is caused to be of configuration including EAV (End of Active Video) block, ancillary data block, payload block, SAV (Start of Active Video) block, and CRCC (Cyclic Redundancy Check Code) block.

14. A transmission system as set forth in claim 13, wherein header data peculiar to the predetermined serial transmission format is inserted into the ancillary data block.

15. A transmission system as set forth in claim 14, wherein destination address indicating transmission destination of the video data and source address indicating transmission source of the video data are included in the header data, and wherein the same destination address and the same source address are set as header data corresponding to the payload portion into which the video data of N times speed is inserted.

16. A transmission system as set forth in claim 15, wherein timing signal indicating signal processing timing of video data inserted into the payload portion is inserted into the EAV block and the SAV block.

17. A transmission system as set forth in claim 16, wherein the format converting means includes header adding means for adding the header data to the encoded video data, and CRCC data adding means for generating flag data indicating the timing signal to add its flag data to the EAV block and the SAV block of the video data.

18. A transmission method for carrying out transmission of video data of plural channels, the method comprising the steps of:

encoding the video data of plural channels to thereby generate encoded video data of plural channels, inserting the encoded video data of plural channels into payload portion of a predetermined serial transmission format to thereby generate video data converted into data of a predetermined serial transmission format, each of said plural channels comprising destination address information to be received at a relaying transmitting unit and to be converted into destination address information conforming to destinations at a plurality of receiving sections without setting each respective receiving section thereof to specifically receive data from a particular predetermined channel before said destination address information is embedded into the video data, multiplexing video data of plural channels converted into data of the predetermined serial transmission format to thereby generate multiplexed video data of a predetermined serial transmission format, and carrying out transmission of multiplexed data of the predetermined serial transmission format.

19. A transmission method as set forth in claim 18, wherein the predetermined serial transmission format is caused to be of configuration including EAV (End of Active Video) block, ancillary data block, the payload data block, SAV (Start of Active Video) block, and CRCC (Cyclic Redundancy Check Code) block.

20. A transmission method as set forth in claim 19, wherein header data peculiar to the predetermined serial transmission format is inserted into the ancillary data block.

21. A transmission method as set forth in claim 20, wherein the header data are adapted so that destination addresses indicating transmission destination of the video data of plural channels are set every the plural channels.

22. A transmission system as set forth in claim 21, wherein the video data is encoded every 1GOP (group of pictures) on the basis of the MPEG (Moving Picture Experts Group) standard, and wherein the video data of plural channels are multiplexed with time period corresponding to the 1GOP being as one sequence.

23. A transmission method for carrying out transmission of video data of plural channels of a transmitting unit for transmitting video data of plural channels to a receiving unit, wherein, at the transmitting unit side, the method comprising the steps of:

reproducing encoded video data of plural channels at N times speed, converting video data of plural channels reproduced at N times speed into data of format for a predetermined serial transmission in order to carry out transmission at rate corresponding to the N times speed, each of said plural channels comprising destination address information to be received at a relaying transmitting unit, and to be converted into destination address information conforming to destinations at a plurality of receiving sections without setting each respective receiving section thereof to specifically receive data from a particular predetermined channel before said destination address information is embedded into the video data, and carrying out transmission of format-converted video data of N times speed at rate corresponding to the N times speed from the transmitting unit to the receiving unit, and wherein, at the receiving unit side, the method comprises the steps of receiving video data of N times speed transmitted at rate corresponding to the N times speed from the transmission means, and recording received video data of N times speed at N times speed.

24. A transmission method as set forth in claim 23, wherein the predetermined serial transmission format is caused to be of configuration including EAV (End of Active Video) block, ancillary data block, payload block, SAV (Start of Active Video) block, and CRCC (Cyclic Redundancy Check Code) block.

25. A transmission method as set forth in claim 23,
wherein header data peculiar to the predetermined serial transmission format is inserted into the ancillary data block.

26. A transmission method as set forth in claim 25,
wherein destination address indicating transmission destination of the video data and source address indicating transmission source of the video data are included in the header data, and
wherein the same destination address and the same source address are set as header data corresponding to the payload portion into which the video data of the N times speed is inserted to thereby receive video data at rate of N times speed at the receiving unit side.

27. A data receiving apparatus comprising:
destination information read-out means for reading out all destination address information of input data,
receiving means in which predetermined receiving addresses are set and adapted for receiving data of corresponding set one of the receiving addresses of the input data, and
address setting means for setting receiving address at the receiving means on the basis of the destination address information that the destination information read-out means has read out.

28. A data receiving apparatus as set forth in claim 27,
wherein there are provided plural ones of the receiving means, and the respective receiving means are adapted so that receiving addresses are respectively set by the address setting means and adapted for receiving only data of corresponding set one of the receiving addresses of multiplexed data consisting of the input data of plural kinds of destinations.

29. A data receiving apparatus as set forth in claim 27,
wherein at least the destination information read-out means reads out destination address information of the input data, and the address setting means comprises delay means having delay time corresponding to time required until the address setting means sets the receiving address at the receiving means and adapted to delay the input data to send it to the receiving means.

30. A data receiving apparatus as set forth in claim 27,
which comprises signal processing means for processing data outputted from the receiving means to convert it into transmit signal.

31. A data receiving apparatus as set forth in claim 27,
wherein the destination address information is added to header of the input data.

32. A data receiving method comprising:
a destination information reading step of reading out all destination address information of input data;
an address setting step of setting receiving addresses of receiving means on the basis of the destination address information which has been read out at the destination information reading step; and
a receiving step of receiving data of corresponding set one of the receiving addresses of the input data by the receiving means in which predetermined receiving addresses are set at the address setting step.

33. A data receiving method as set forth in claim 32,
wherein there are provided plural ones of the receiving means and respective receiving means are adapted so that receiving addresses are respectively set at the address setting step and adapted for receiving only data of corresponding set one of the receiving addresses of multiplexed data consisting of the input data of plural kinds of addresses.

* * * * *